May 29, 1934.  A. H. STOW  1,961,018
MINE CAR AND THE LIKE
Filed July 24, 1922  10 Sheets-Sheet 1
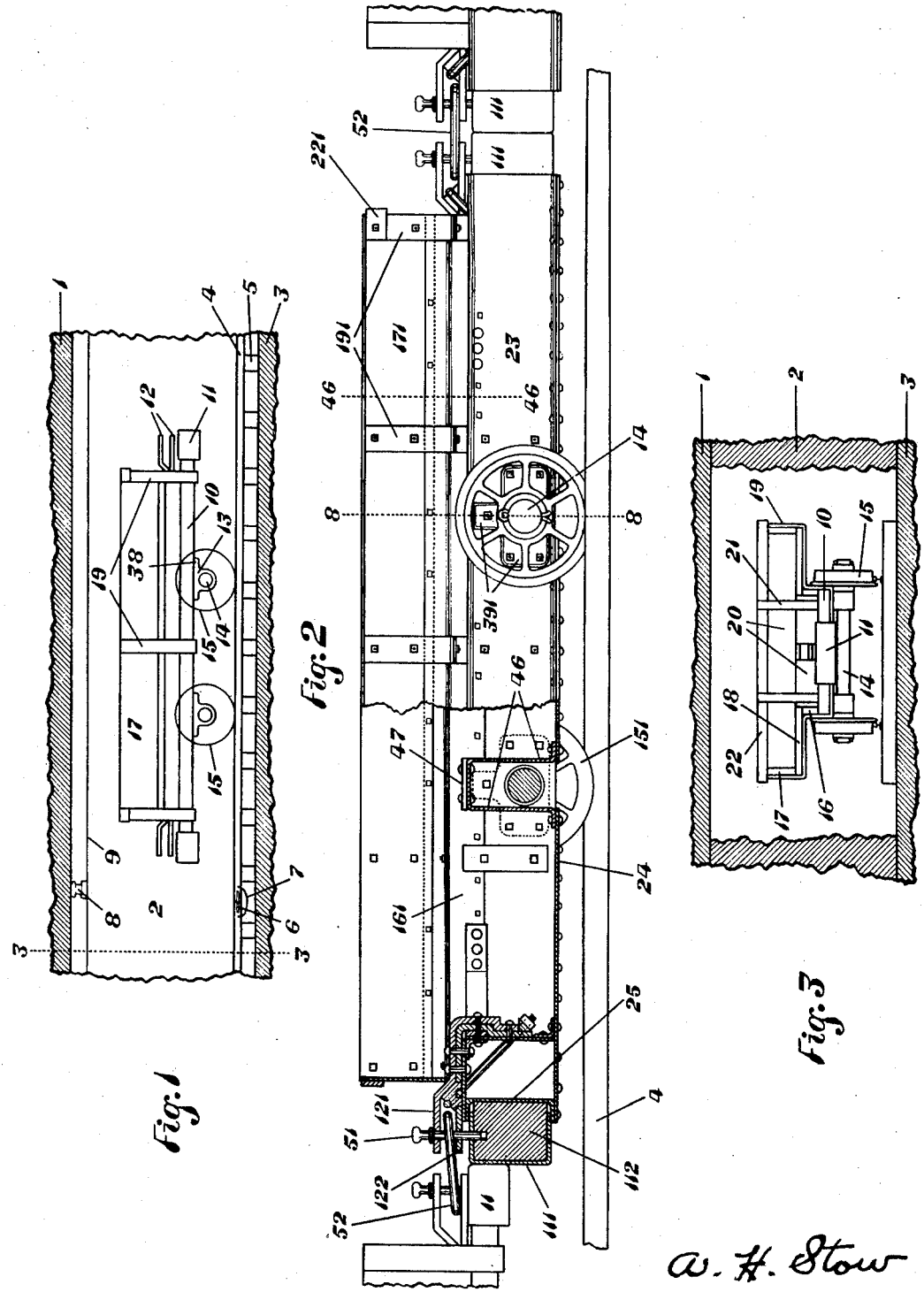
INVENTOR
A. H. Stow
BY
ATTORNEY

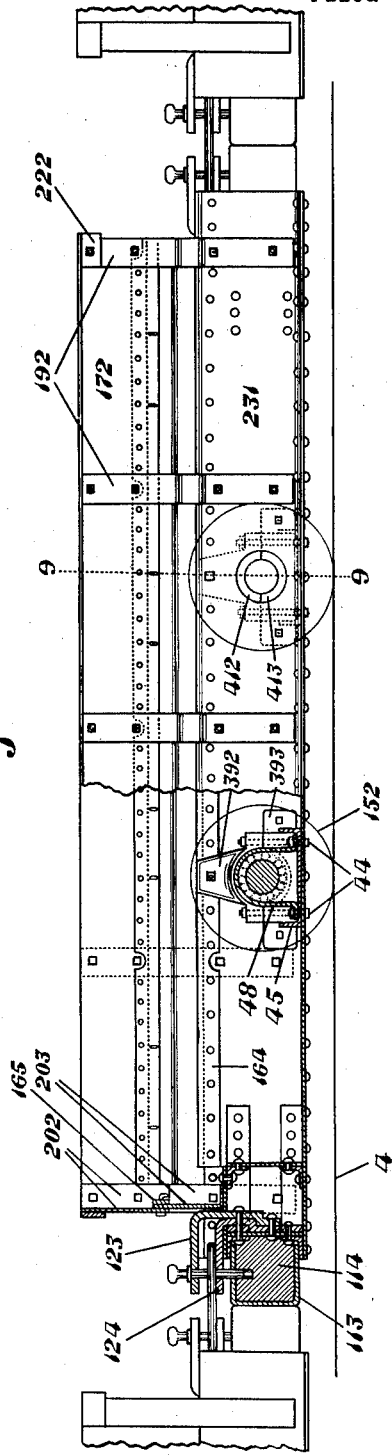

May 29, 1934.  A. H. STOW  1,961,018
MINE CAR AND THE LIKE
Filed July 24, 1922  10 Sheets-Sheet 3
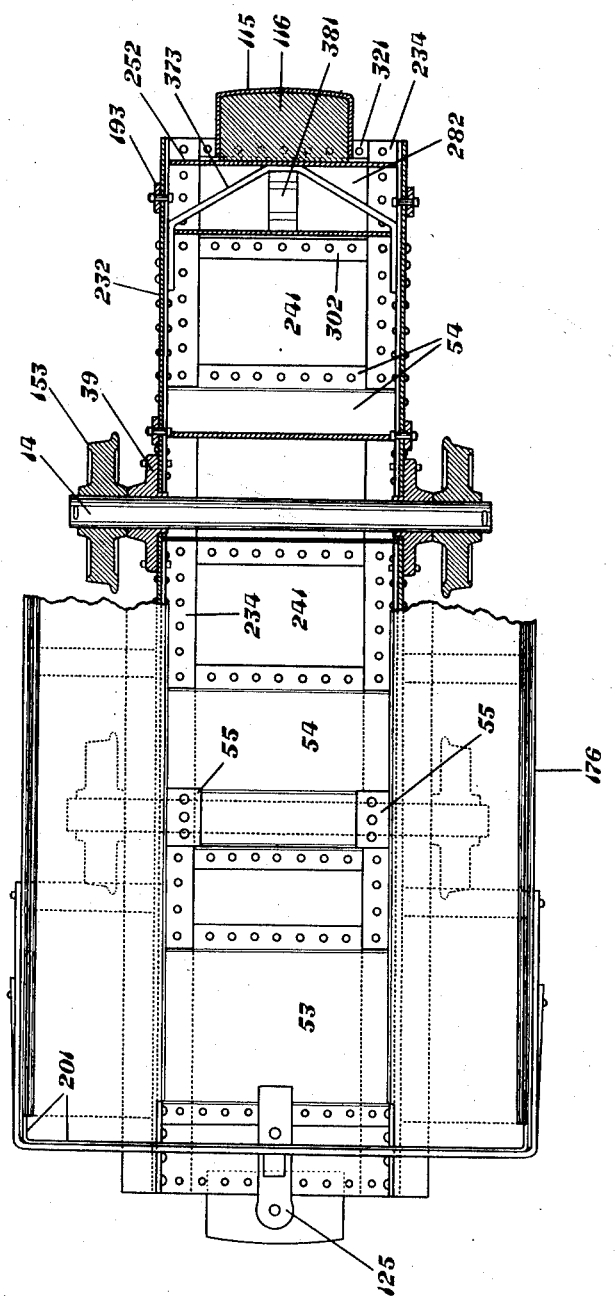

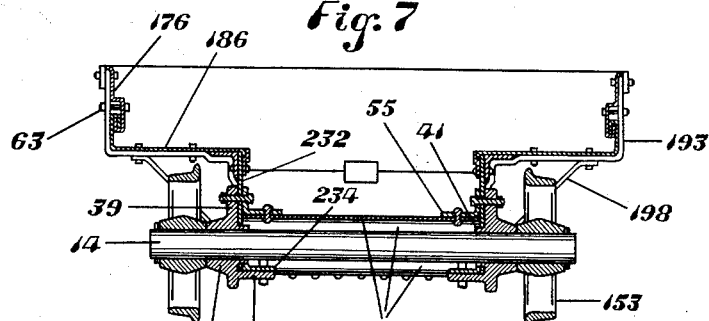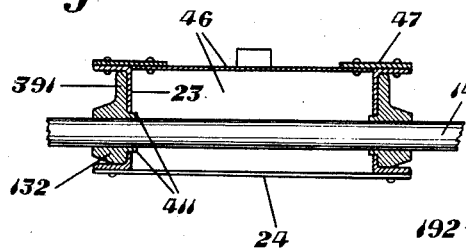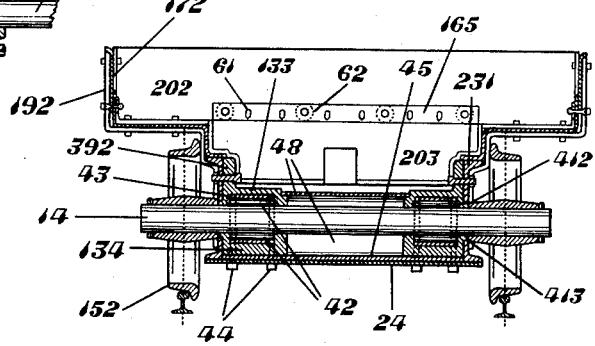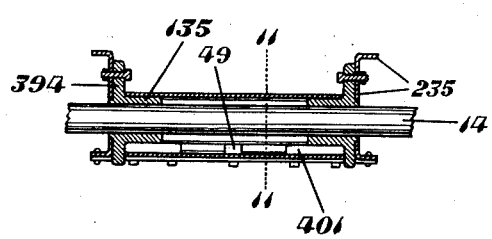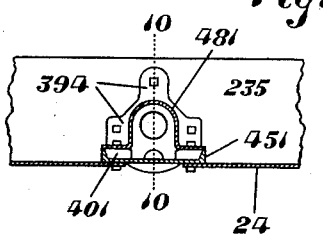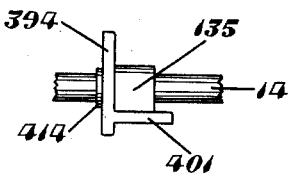

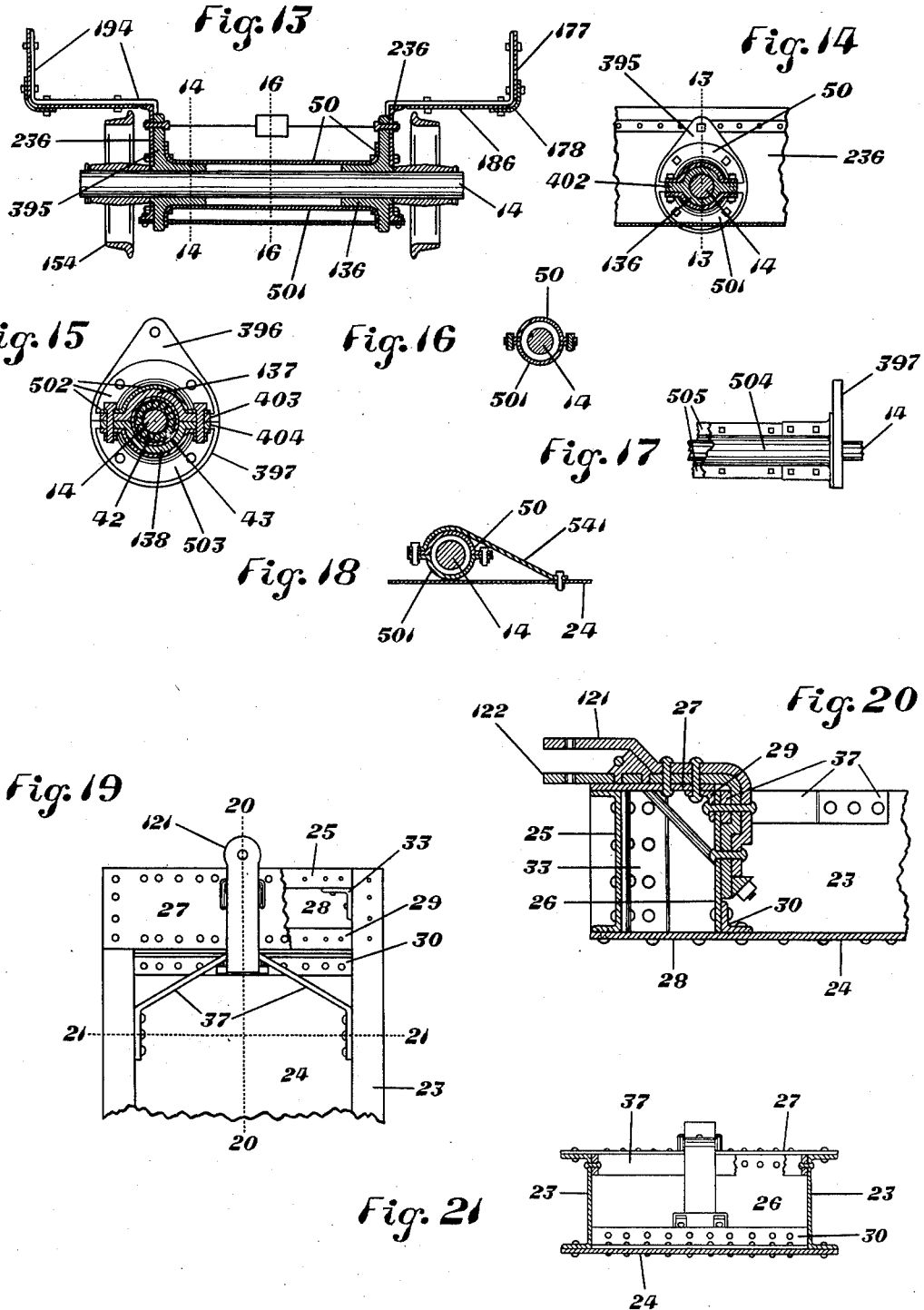

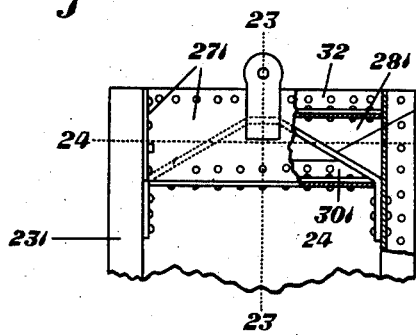
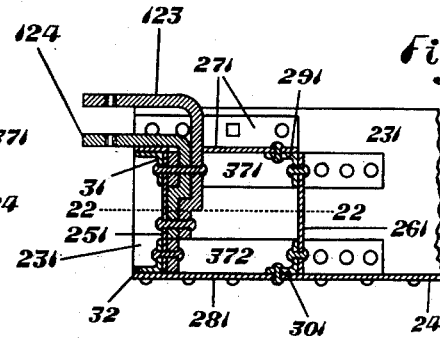
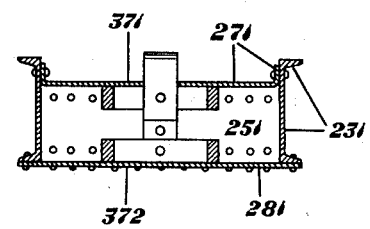
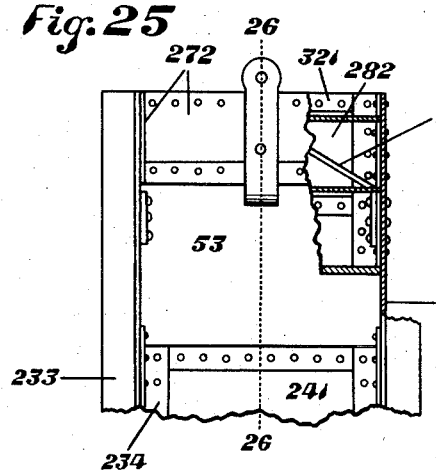
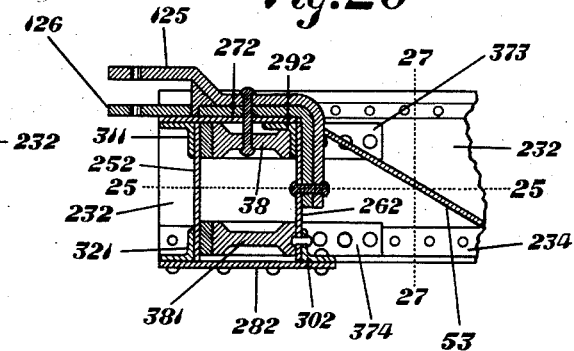
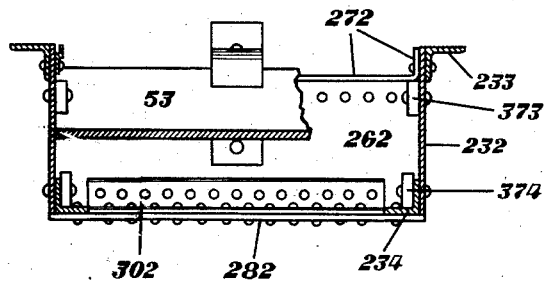

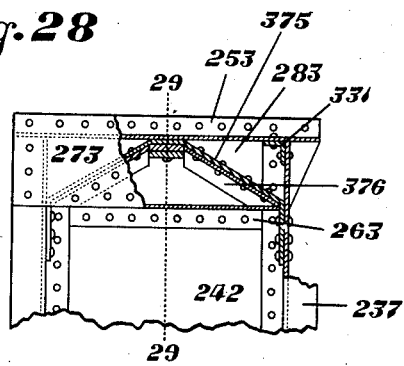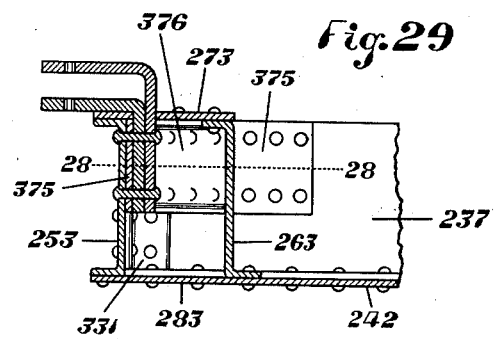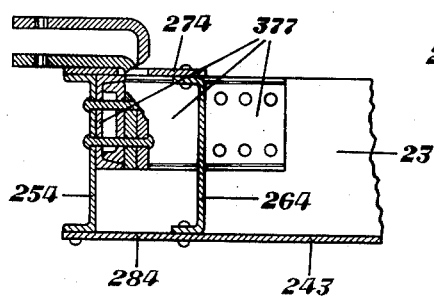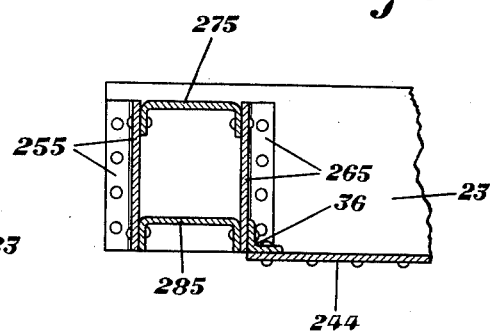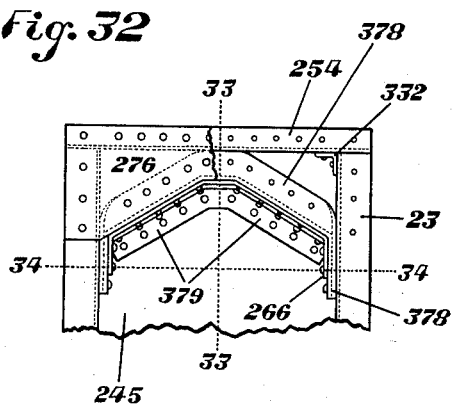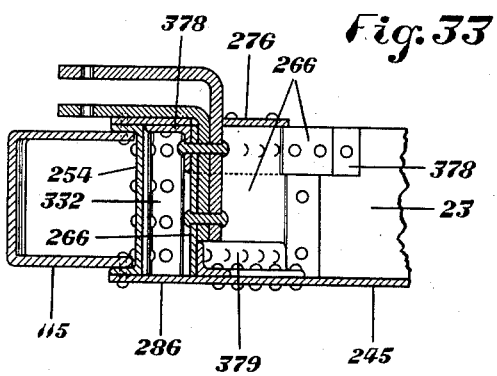

May 29, 1934.  A. H. STOW  1,961,018
MINE CAR AND THE LIKE
Filed July 24, 1922  10 Sheets-Sheet 8
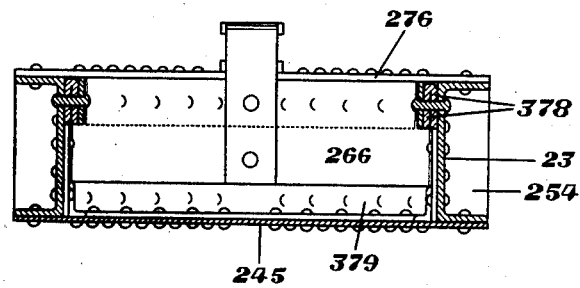
Fig. 34
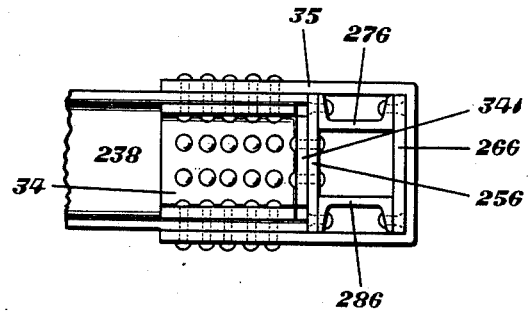
Fig. 35
Fig. 36  Fig. 37  Fig. 38  Fig. 39
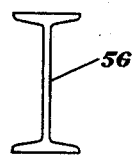 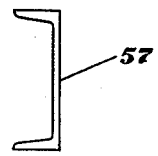 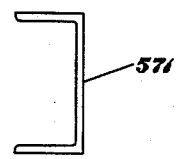 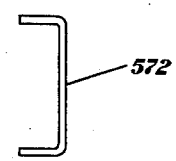
Fig. 40  Fig. 41  Fig. 42  Fig. 43
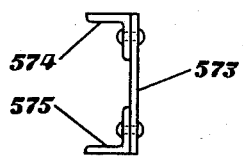 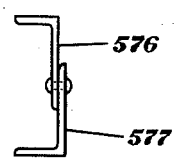 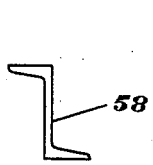 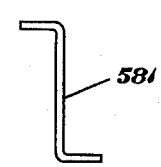
A. H. Stow
INVENTOR
BY Hubert E. Peck
ATTORNEY

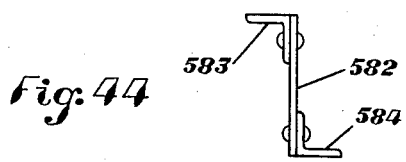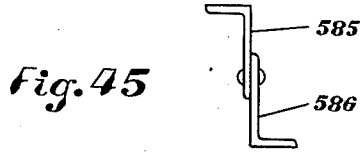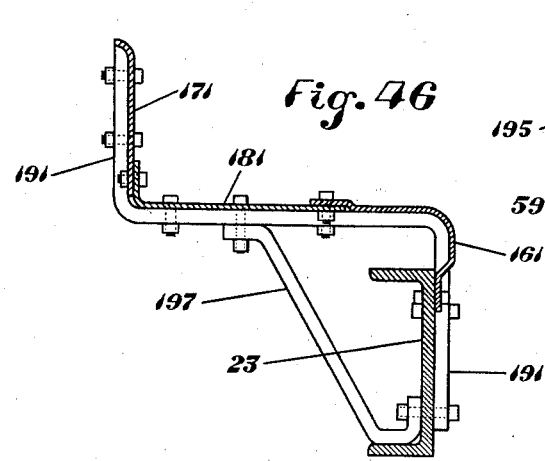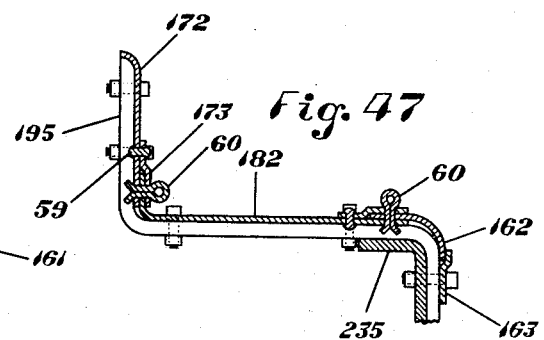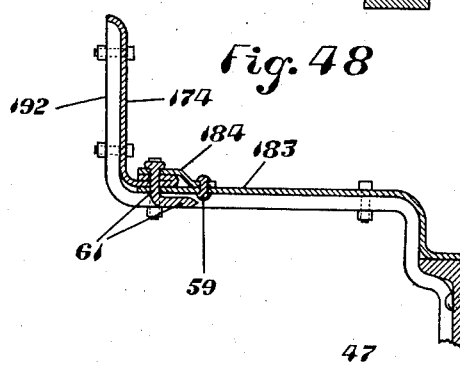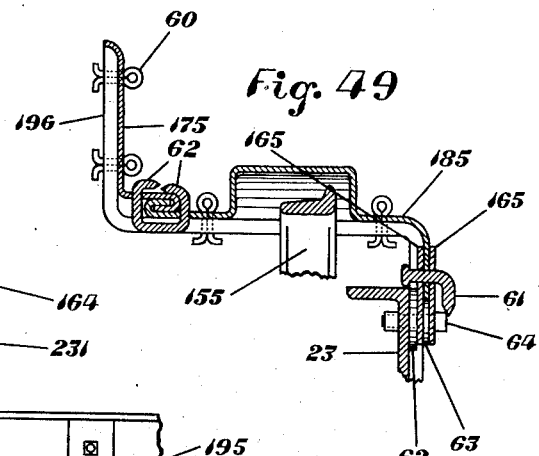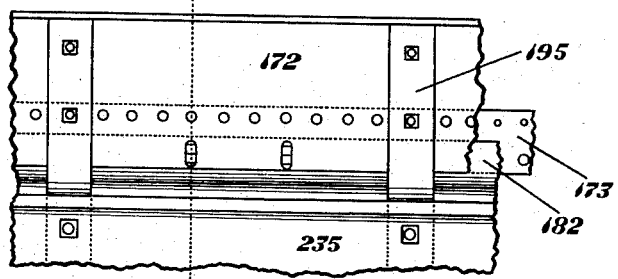

May 29, 1934.　　　A. H. STOW　　　1,961,018
MINE CAR AND THE LIKE
Filed July 24, 1922　　　10 Sheets-Sheet 10
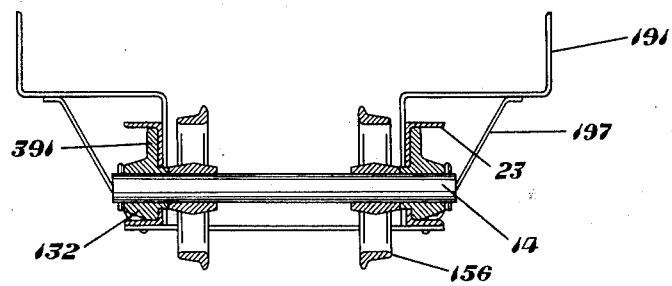
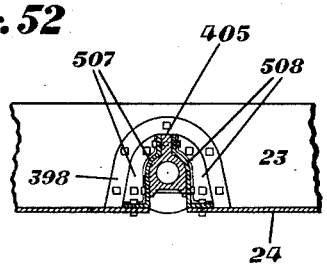
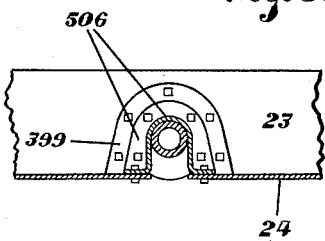
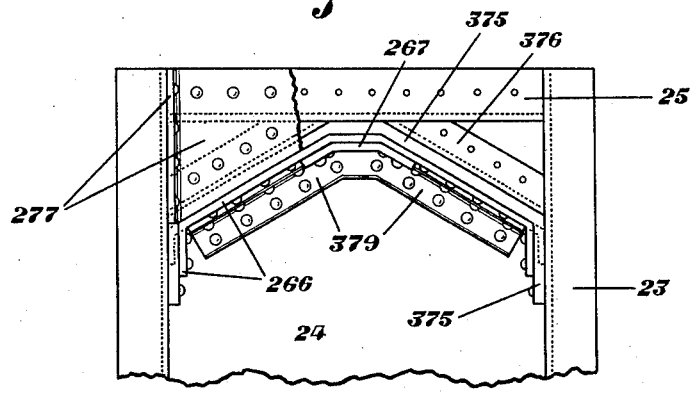
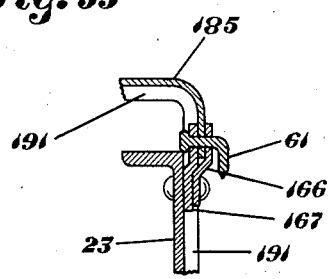
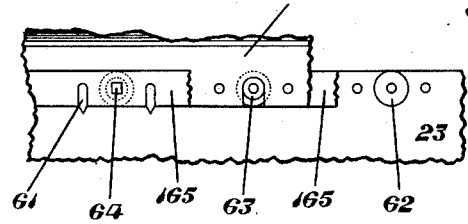

Patented May 29, 1934

1,961,018

UNITED STATES PATENT OFFICE 1,961,018

MINE CAR AND THE LIKE

Audley Hart Stow, Charleston, W. Va., assignor, by mesne assignments, to Sanford Investment Company, Wilmington, Del., a corporation of Delaware Application July 24, 1922, Serial No. 577,172

103 Claims. (Cl. 105—364)

This invention relates to mine and other cars; and the objects and nature of my invention will be readily understood by those skilled in the art in the light of the following explanations of the accompanying drawings showing what I now believe to be the preferred mechanical expressions or embodiments of my invention from among other forms, constructions and arrangements within the spirit and scope thereof.

An object of the invention is to provide improvements in mine cars with the end in view of attaining maximum lading capacity for a given set of transverse out to out dimensions, consistent with efficiency of operation, reasonable first cost and upkeep.

A further object of the invention is to provide an improved wing type mine car to attain maximum lading capacity, efficiency in operation, and maximum length where transverse dimensions are limited by mine conditions and requirements.

A further object of the invention is to provide improvements that are applicable to stripping cars, quarry and other cars as well as to mine cars.

A further object of the invention is to provide a lading carrying car embodying a strongly constructed traction truck and demountable sheet metal sidings for the lading retaining body of the car, particularly sectional demounting sidings.

With these and other objects in view, my invention consists in certain novel features in construction and arrangement and in combinations as more fully and particularly set forth and specified hereinafter.

Referring to the accompanying drawings:

Fig. 1 is a section, approximately to scale of a modern coal mine, along a main haulage way, equipped for electric haulage, and exposing a side view of the old type so-called all wood mine car, adapted to dumping sidewise, standing on its track, Fig. 2 is a side view of my wing type high bumper mine car adapted to work in with the all-wood car shown in Fig. 1; partially in longitudinal section, at one end showing part of a car of Fig. 1 and at the other end showing part of another car of my invention;

Fig. 3 is a section along line 3—3, Fig. 1 exposing a front view of the old all-wood mine car;

Fig. 4 is a side view of another form of my mine car of the side wise dumping type, and showing variations in details of construction.

Fig. 5 is also a side view of my high bumper end dump car, showing still further variations in details of construction.

Fig. 6 is a top view of the car shown in Fig. 5, a portion being shown in a horizontal section on the line 6—6, Fig. 5.

Fig. 7 is a vertical section on the line 7—7, Fig. 5.

Fig. 8 is a vertical section on the line 8—8, Fig. 2.

Fig. 9 is a section on the line 9—9, Fig. 4.

Fig. 10 is a section on the line 10—10, Fig. 11.

Fig. 11 is a detail section on the line 11—11, Fig. 10;

Fig. 12, is a side view of the inside axle boxing shown in Figs. 10 and 11, with the axle in position.

Fig. 13 is a section on the line 13—13, Fig. 14.

Fig. 14 is a section on the line 14—14, Fig. 13;

Fig. 15 is a view similar to Fig. 14, showing an inside roller bearing axle journal boxing;

Fig. 16 is a section on the line 16—16, Fig. 13;

Fig. 17 is a side view of another form of my improved removable flanged split axle tube, the longitudinal flanges being vertical, instead of horizontal, as in Fig. 16;

Fig. 18 is a view similar to Fig. 16 showing in addition my improved removable axle deflector plate;

Fig. 19 is a top view of the front end of the traction truck shown in Fig. 2, but with the top face plate of the box girder end beam partially broken away;

Fig. 20 is a section on a larger scale, on the line 20—20, Fig. 19;

Fig. 21 is a section on the line 21—21, Fig. 19;

Fig. 22 is a top view of the forward end of the traction truck shown in Fig. 4, partially in section on the line 22—22, Fig. 23;

Fig. 23 is a section, on a larger scale, on the line 23—23, Fig. 22;

Fig. 24 is a section on the line 24—24, Fig. 22;

Fig. 25 is a top view of the front end of the traction truck shown in Fig. 5, partially in section on the line 25—25, Fig. 26;

Fig. 26 is a section, on a larger scale, on the line 26—26, Fig. 25;

Fig. 27 is a section, also on a larger scale, on the line 27—27, Fig. 26;

Fig. 28 is a top view of the forward end of a still different form of traction truck, partially in section on the line 28—28, Fig. 29, and showing a still different form of diagonal box girder end beam reinforcing;

Fig. 29 is a section, on a larger scale, on the line 29—29, Fig. 28;

Fig. 30 is a similar view to Fig. 29, with a portion of the draw-bar broken away to show the top edge of the channel diagonal reinforcement of the box girder end beam;

Fig. 31 is a similar view to Fig. 30, of a still different form of box girder end beam, but with the draw-bar entirely removed;

Fig. 32 is a top view of the front end of another form of traction truck provided with specially designed re-entrant double diagonal end beam, with draw-bar removed, and with the right portion of the top face plate of the end beam removed to show the remainder of the end beam and its connection with the side sill;

Fig. 33 is a section, on a larger scale, on the line 33—33, Fig. 32;

Fig. 34 is a section, on a larger scale, on the line 34—34, Fig. 32;

Fig. 35 is a side view of the rear end of a traction truck showing another form of box girder end beam, placed entirely beyond and abutting against the side sills;

Fig. 36 shows a rolled I-beam in end view;

Fig. 37 shows a rolled structural channel in end view;

Fig. 38 is an end view of a rolled ship channel;

Fig. 39 is an end view of a pressed channel;

Fig. 40 is an end view of a built up channel;

Fig. 41 is an end view of another form of built up channel;

Fig. 42 is an end view of a rolled Z-bar;

Fig. 43 is an end view of a pressed Z-bar;

Fig. 44 is an end view of a built up Z-bar;

Fig. 45 is an end view of another form of built up Z-bar;

Fig. 46 is a broken section, on a larger scale, on the line 46—46, Fig. 2, showing the simplest form of my sectional steel siding;

Fig. 47 is a section on line 47—47, Fig. 50;

Fig. 48 is also a similar view to Fig. 46 showing still another form of my sectional steel siding;

Fig. 49 is also a similar view to Fig. 46 showing still another form, of my sectional steel siding;

Fig. 50 is a broken side view, of a portion of the lading holding body in which that form of sectional steel siding shown in Fig. 47 is shown in position with respect to its supporting belts or binders;

Fig. 51 is a view similar to Fig. 7 showing however, a narrow gauge truck, with inside wheels;

Figs. 52 and 53, are views similar to Fig. 11, showing variations in forms of sectional axle tubing;

Fig. 54 is a view similar to Fig. 32, showing still a different form of re-entrant double diagonal end beam;

Fig. 55 is a view similar to Fig. 46 showing variations in sectional siding;

Fig. 56 is a side view of the same style of sill siding joint, shown in Fig. 49, the several parts broken away, successively, the more clearly to show their arrangement.

Taking the wing type car of Figs. 2, 8, 20, 21 and 46, as the basis for a general description, the car embodies a traction truck and an upwardly extending lading retaining body. The traction truck embodies parallel longitudinal side sills 23 having top and bottom horizontal flanges or members and a vertical connecting web or member. These side sills are composed of any suitable structural steel or other suitable metal, although in this particular form, said sills are each composed of a length of ship channel 23 (see 571, Fig. 38).

The side sills are rigidly connected at their ends by suitable end beams or sills, which are preferably of the box girder type, as hereinafter explained.

In the structure of Fig. 2 (see Figs. 19, 20, 21) the end beams are arranged between the ends of the side sills and are rigidly connected thereto by riveted vertical corner angles 33 and diagonal bracing 37. In this particular form each end beam consists of parallel front and rear flanged structural steel beams, spaced apart, and at their ends abutting the inner vertical sides of the side sills. The front beam is formed by a channel 25, and the rear beam is of the type shown by Fig. 44, consisting of a vertical plate 26 and top angle riveted to the plate 26 and the top face plate 27, and the bottom angle riveted to the car botom 24 and plate 26.

The car bumpers are fitted in, fixed to and project forwardly from the outer end channels 25 of the end beams and each consists of sheet steel face plates 111 riveted to the flanges of plates 25 and wood filler blocks 112. The draw bars to receive coupling pins 51 and links 52, in the structure of Fig. 2, consist of upper and lower heads 121, 122, overhanging the bumpers, and traversing the top plates 27 and rear plates 26 of the end beams and riveted thereto, as more fully set forth hereinafter.

In the construction of Fig. 2 the car floor of lading supporting bottom, is composed of horizontal relatively thin or light sheet steel 24 arranged below the side and end sills and traversing and riveted to the under faces of the bottom flanges of said end and side sills. This floor closes the rectangular frame formed by said sills, at the bottom, and is extended to the ends thereof to form the bottom face plates 28 of the two end sills.

This floor aids in bracing and stiffening the traction truck, and is arranged as low down, as near to the track, as practical and consistent with safety. To permit this low down arrangement of the lading supporting floor, I provide the vertically deep side sills, and extend the rotary car axles 14, through said sills, intermediate the top and bottom flanges of the sills, and in Fig. 2, locate the car wheels 151 under the wings of the car and at the outer vertical sides of the side sills.

The vertical webs or connecting members of the side sill beams are weakened where punched to provide holes for passage of the axles, and suitable boxings must be provided for the axles. I utilize these boxings to reinforce and strengthen the weakened parts of the side sills and also to carry the weight of the car and its lading. Various constructions can be provided for this purpose, as hereinafter set forth.

Briefly, the boxings 132 of Fig. 2 (see Fig. 8) fit the outer vertical faces of the side sills and have extensions 411 extending into and through said sills so that the boxings interlock with the sills. These boxings 132 also have integral vertical and horizontal wings or extensions 391 fitting the outer vertical faces of the side sills that are riveted to the vertical webs of the sills to brace and strengthen the structure, as hereinafter set forth.

The car axles 14 are above the plane of the car bottom and traverse the lading space of the car, and in the construction of Fig. 2, the axles are protected from the lading by hoods 46 which constitute cross braces between the side sills, as pointed out hereinafter.

The advantages and characteristics of my new wing type mine car are hereinafter pointed out, wherein the traction truck itself forms the lower portion of the lading holding body (the depth of the side and end sills above the lading supporting sheet metal floor). The upper part of the lading retaining body in the car of Fig. 2 (Fig. 46) is composed of sheet metal vertical end cross plates rising from the end sills or beams at the end belts 191, and sectional demountable siding plates 161, 181, and 171 mounted on and carried by the belts 191. The vertical lower ends of these belts extend down within the car truck and fit and are secured to the inner vertical faces of the side sills 23. The belts have intermediate outwardly projecting horizontal portions to support the floors of the car wings, and upwardly extending outer ends to support the upwardly extending outer side walls of the wings.

Various constructions of belts can be employed as hereinafter set forth.

The overhang of the top of the cars in common use in coal mines, over the rails, is usually termed, in mining parlance, the mine car wings; the lowest part of the lading holding body, being kept between the wheels. These cars have been more commonly made largely of wood.

With my new type wing mine car, there is a substantial gain, in the transverse net lading area, while the length may be readily increased beyond what is practical with "all-wood cars."

My mine car may be said to consist generally of a relatively light lading holding body suitably supported by and attached to, a relatively strongly braced traction truck. The lading holding body may be of wood, as heretofore, or of sheet metal, suitable means being provided for the support and attachment thereof.

The primary objects of the traction truck are to transmit the haulage strains, both tractive and compressive; to suitably support the lading holding body and its contents during transit; and to add substantially to the lading capacity of the lading holding body. My new type car, may therefore, be also described as consisting of an upper and relatively light lading holding body, in combination with a lower and strongly braced lading holding body, so designed as to both serve as a support for the upper lading holding body and as a traction truck.

Cars may be emptied of their lading, either by tilting endwise, or by turning over sidewise. My end dump car (Fig. 5) is substantially the same as my side wise dumping car (Figs. 2, 4) with the addition of axle and bumper deflector plates.

The roof strata 1, Fig. 1, may be said to be supported by the coal 2, which in turn rests on the bottom strata 3. The track consists of the rail 4, and ties 5, the sections of rail being connected by the rail splices 6, and bonding 7; the trolley hanger 8 attached to the roof and supporting the trolley wire 9. The old type wooden car shown, embodies the lading bottom 10 usually composed of three wood planks side by side, shod with sheet metal bumpers 11, and serving the double purpose of supporting the lading and of taking care of the compressive haulage strains; draw bars 12 attached to the car bottom being provided to take care of the tractive haulage strains. The car bottom rests on the axle bearings 13, through which pass the axles 14 equipped with wheels 15.

The lading holding body may be said to consist of the inner vertical sides 16, the outer vertical sides 17, and the wing bottoms 18. Around the car bottom and the lading holding body, pass the belts or binders 19 binding the bottom and body together.

The ends of the lading holding body are closed by wood plank 20 held in place by the vertical end braces 21, the horizontal end brace 22 assisting the belts in keeping the lading body from spreading at the top when loaded.

It is therefore evident, the supporting member of the old type car which also serves as the lading bottom is a wood beam. In my new type mine car, I replace this shallow wood beam by two relatively narrow and deep right line metal beams, forming the side sills, disposed more usually between the wheels and as closely adjacent thereto, as otherwise practical, and extending, approximately, the length of the car; the upper horizontal members of the side sills, being disposed at such height above the axles, as may best suit the desired design while the lower horizontal members of the side sills are disposed not merely below the axles, but as close to the track, as otherwise practical; the lading bottom (thin sheet metal) attached to the lower portions of the side sills, and thus attaining the maximum lading depth consistent more particularly with reasonable track clearance.

*Side sills*

The side sills shown in Figs. 2, 4, and 5, are ship channels, structural channels, and built up Z-bars respectively, as will be evident by reference to Figs. 21, 24, and 27.

As shown in Fig. 21, the ship channels 23, serve as side sills. As shown in Fig. 24, the structural channels 231, serve as side sills. The built-up Z-bar, side sills, shown in Fig. 27, consist of the vertical web plates 232, to which are riveted, the upper angles 233, and the lower angles 234, flush with the edges of the web plates, but on opposite sides thereof. As shown in Figs. 10 and 47, the side sills 235, are pressed channels. As shown in Fig. 13, the side sills 236 are again structural channels but of greater depth, relatively, than in Fig. 4. The side sills 237, Figs. 28 and 29, are pressed Z-bars. The side sills 23, Figs. 30, 31, 32, 33, and 34, are again ship channels. The side sills 238, Fig. 35 are I-beams, see also Fig. 36.

As shown in Figs. 20, 21, 23, 24, the sheet metal lading bottom 24 is riveted to the lower horizontal members of the several forms of side sills shown.

*End beams*

The haulage strains, both tractive and compressive, are transmitted to the side sills by means of box girder end beams of suitable types, which may be either entirely within the side sills, partly within and partly beyond, or entirely beyond but abutting against the ends of the side sills. Increasing the width of the box girder in the direction of the haulage strains for heavier service, reduces the space available for lading within the traction truck. The box girder may also be strengthened by diagonal bracing which if exteriorly of the box girder will somewhat obstruct the flow of lading when car is being emptied. These several items admit of an admirable solution by placing the diagonal bracing within the box girder of such breadth in the direction of the haulage strains that the box girder will of itself have considerable strength, while also admitting of placing the diagonal bracing at such angles as will make the same commercially economical; the diagonal bracing being of suitable types for the purpose.

Box girders may be said to consist essentially of two horizontal, and two vertical members suitably united at the corners. The horizontal members may be termed the upper and lower members, the vertical members the front and rear members. Herein the construction consists, generally, of two parallel channels and two parallel face plates, the channels, for instance, being either the horizontal or vertical members, as may best suit the desired design.

Figs. 20, 23 and 26 show on a larger scale, the box girder end beams shown in Figs. 2, 4, and 5.

As shown in Fig. 20, the ship channel 25 forms the front member and the web plate 26, the rear member of the box girder end beam; the upper member being the face plate 27 and the lower member, face plate 28, a forward extension of the lading bottom 24, the upper connecting angle 29 and the lower connecting angle 30, forming with the web plate, a built up Z-bar. See also Figs. 19 and 21.

As shown in Fig. 23, the web plate 251 forms the front member, the web plate 261, the rear member, the face plate 271, the upper member, the face plate 281, a forward extension of the lading bottom plate 24, the lower member; the rear upper and lower connecting angles, 291 and 301, respectively, and forward upper and lower connecting angles 31 and 32, respectively, forming, with their respective web plates, two built up channels. See also Figs. 22 and 24.

As shown in Fig. 26, the front and rear web plates, 252 and 262, respectively, form the vertical members, and the upper and lower face plates 272 and 282, respectively, the horizontal members; the two rear connecting angles 292 and 302, respectively, forming with their web plate, a built up Z-bar, while the two forward connecting plates 311 and 321, respectively, form with their web plate, a built up channel. See also Figs. 25 and 27.

The box girder end beams, shown in Figs. 29, 30, 31 and 35, show still further variations, in details of construction. The box girder end beam, shown in Fig. 29, consists of the ship channel 253, as the front member, the pressed Z-bar 263 the rear member, the upper face plate 273 and, the lower face plate 283, a forward extension of the lading bottom 242. See also Fig. 28.

In the box girder end beam shown in Fig. 30, the ship channel 254, and the pressed channel 264, form the front and rear members, respectively, the face plates 274 and 284 the upper and lower members, respectively. In the box girder end beam shown in Fig. 31, the face plates 255 and 265, form the front and rear members, respectively, while the pressed channels 275 and 285, form the upper and lower members, respectively. In the box girder end beam shown in Fig. 35, the face plates 256 and 266, form the front and rear members, respectively, while the upper and lower structural channels 276 and 286, respectively, form the horizontal members.

The box girder end beams may be attached to the side sills by any suitable means. As shown in Fig. 19, the angle 33 is riveted to the vertical faces of the end channel 25 and of the side channel 23, see also Fig. 20. In the same way, as shown in Fig. 28, the angle 331, is riveted to the vertical faces of the channel 253 forming the front member of the box girder and of the side wall 237, see also Fig. 29. In the same way, as shown in Fig. 32, the angle 332 serves to unite the channel 254 of the box girder and the side sill 23, see also Fig. 33. As shown in Fig. 35, the plate 34, riveted to the vertical face of the I-beam side sill 238, has an upturned edge 341 which is in turn riveted to the forward box girder face plate 256; the metal stirrup 35 fitting and passed around the box girder end beam being riveted to the upper and lower flanges of the side sill.

The box girder end beams may be also attached to the side sills by means of their face plates, suitably extended therefor; the details, however, depending somewhat on the relative heights of the box girders and side sills.

As the load and length is increased, the depth of the side sills will more usually be increased whereas the strength of the end beam may be increased by increasing its width in the direction of the haulage strains, economy of material, being represented by no greater height than the service requires; an important function however, of the end beam being the protection of the sheet metal lading bottom from obstructions in the track.

Where a high bumper is required to work in with old type equipment as shown in Fig. 2, the depth of bumper will more usually, with large diameter wheels, be such that a side sill of the same depth will be commercially economical for the maximum load and length. In such cases, the upper and lower face plates may be extended in right lines above and below, respectively, the horizontal members of the side sills so that they may be riveted thereto.

As shown in Fig. 19, the box girder upper face plate 27, extends entirely across the upper horizontal members of the side sills 23, and is riveted thereto. In the same way, the lower face plate 28, extends across the lower horizontal members of the side sills and is riveted thereto at either end. See also Figs. 20 and 21. This same arrangement is shown in Figs. 28, 29 and 30.

The lower bumper car, shown in Fig. 4, represents something of an economy in material. The lower face plate 281, Fig. 24, is still extended in a right line so that it may be riveted at either end to the lower horizontal members of the side sills 231. The upper face plate 271, however, is turned up at right angles, at either end so that the upturned ends, may be riveted to the inner vertical faces of the side sills. See also Figs. 22 and 23.

Even with a high bumper car, as in Fig. 5, the high end sill will still be relatively a depressed end sill or end beam. As shown in Fig. 27, the lower face plate 282 is riveted to the under sides of the angles 234, forming the lower horizontal members of the built-up Z-bar side sills; the ends of the upper face plate 272, being turned up and riveted to the upper edges of the side sills. See also Figs. 25 and 26.

The end beam shown in Fig. 31, may be said to be placed between the top and bottom of the side sill, the details however, being such that the lading bottom 244 is reasonably protected. As shown, the vertical face plates 255 and 265, have their ends bent laterally at right angles and riveted to the side sill 23. The angle 36 riveted to the bottom of the rear face plate, and to the forward edge of the lading bottom, serves to support the lading bottom between the side sills.

*Diagonal bracing*

The lading bottom 24, Fig. 20, may be considered a rearward extension of the lower face plate 28 so that practically the latter has considerably greater width and therefore far greater resisting power than the upper face plate 27. Diagonal bracing, therefore, of the end beam at the bottom may, more usually, be omitted.

The outside flat metal diagonal brace 37, Fig. 19, the ends riveted to the side sills and the center bearing against the web 26, at its upper edge, see Fig. 20, represents the simplest form.

Outside diagonal braces, however, interfere somewhat with the emptying of the lading below them and may therefore be replaced to advantage by inside braces.

The inside flat diagonal braces 371 and 372, Figs. 22 and 23, are also riveted at their ends, to the side sill 231 but bear at their center against the upper and lower rear faces, respectively, of the front web plate 251. See also Figs. 22 and 24.

The inside braces 373 and 374, Figs. 6, 25, 26 and 27, are similar to those immediately above described. The upper and lower struts 38 and 381, respectively, interposed, at the center between the rear faces of the braces and the forward faces of the angle 292 and of the web plate 262, respectively, serve to transmit thereto, the resisting power of the braces.

The flat diagonal braces may be reinforced against compression by riveted angles or other similar forms between their bearing faces. As shown in Fig. 29, the flat brace 375 has riveted to it, the channel 376, extending from its bearing against the side sill 237 to its bearing against the end channel 253.

Evidently angles, channels or other suitable structural forms, may be so bent, as to serve as the diagonal braces. The diagonal brace 377, Fig. 30, is a structural channel, so bent as to replace the flat braces previously described.

The more essential element of the re-entrant double diagonal end beam, Fig. 32, is the heavy angle 378 so bent as to form the diagonal brace; the horizontal leg of the angle, see also Fig. 33, being bent down vertically at the end next the side sill so as to be between and to bear against, both the vertical leg and the side sill, see also Fig. 34, thus giving the full strength of both legs of the angle, for riveting to the side sill. The web plate 266, bent to conform to the angle brace, is riveted at the top to the vertical leg of the angle brace and is also suitably riveted to the side sills, as shown, thus utilizing its strength in full, as an additional diagonal brace. The horizontal leg of the brace angle is riveted to the under side of the upper face plate 276, which in turn is extended across and is riveted to both the side sills 23, and the end channel 254. The lower part of the web plate is connected to the lading bottom by the similar re-entrant angular brace, 379.

This re-entrant double diagonal end beam is not, technically, a box girder as its cross section is not uniform throughout. As, however, its cross section at right angles to its length, is at all times rectangular, it may nevertheless be described as a beam of the box girder type which increases regularly in breadth either way from the center.

It is to be noted, the end beams shown in Figs. 19, 22, 25 and 31 are entirely within their respective side sills; those shown in Figs. 28, 30 and 32, being only partly within their respective side sills, their front members extending across but abutting against the side sill ends; while the end sill shown in Fig. 35 is entirely beyond, but abutting against the side sills.

Evidently, the several constructions of end beams shown, may be entirely varied and also used in different combinations with each other. For instance, as shown in Fig. 54, the heavy angle 378, Fig. 32, is replaced by the flat diagonal brace 375, Fig. 28, and its stiffener 376, on the opposite side; the flat re-entrant upper face plate 276, of Fig. 32 has been replaced by the slightly narrower similar plate 277, but with upturned riveted ends, similar to the upper face plate 271, Fig. 22; the side sills 23, and the front end beam member 25, being both ship channels; the reentrant back base angle 379, and the rear re-entrant vertical member 266, being those shown in Figs. 32 and 33. The partial rear face plate 267 may be added in the center. Evidently, also again, by increasing the thickness of the rear face plate 266 sufficiently, the diagonal brace 375 may be entirely omitted.

The end beam shown in Fig. 54 may also be said to consist of two integrally united diagonal corner braces of the box type. The several diagonal braces shown herein may be similarly described, as consisting of two integrally united diagonal corner braces, which however, may consist of two separate diagonal corner braces suitably united and placed.

An angle of sixty degrees between for instance, the diagonal brace 375, Fig. 54 and the forward end of the side sill 23 has been selected, in part, merely for the purpose of illustration, but also in part, as a compromise, under average conditions between economy in material and in lading space, but may be varied between wide limits to suit desired designs.

The V braces may be arranged to point toward each other instead of toward the car ends.

Boxings

My new type car admits of several types of axle boxings more particularly, the outside boxing shown in Fig. 7, and the inside boxing shown in Fig. 9, each of which, however, admits of considerable variation in the details of construction.

Outside boxings are more readily put on and replaced if broken; are more readily strengthened at their weakest point immediately under the axle, and also readily admit of direct support of the bottom of the side sills independent of the attaching bolts. Outside boxings, however, necessarily reduce the lading width between the side sills and by the same amount increase the overhang of the wings, thus rendering necessary more metal in their support.

The old type boxing shown in Fig. 1, although usually cast in one piece, may be said to consist of two essentially distinct elements, the axle bearing proper 13, and the horizontal attaching plate 38. My new type boxing more usually cast in one piece, may also be said to consist of two distinct elements, the bearing proper 131, Fig. 7, and its vertical attaching or face plate 39. The outside boxing, when used in conjunction with Z-bar side sills, as in Fig. 7, may also have an inward extension 40, of the lower part of the face plate, which serves the double purpose of strengthening the boxing at its weakest point immediately under the axle and also of directly supporting the side sill lower connecting angle 234, independent of the attaching bolts. The bearing also has an inward annular sill interlocking extension 41. See also Figs. 5 and 6.

The outside bearing 132, also provided with interlocking extension 411, Fig. 8, used with the channel side sill 23, is weakest immediately below the axle, owing to the absence of the face plate 391 below the axle 14. There is ample room however, for a sufficient amount of metal with say the sixteen inch wheels in more common use, without unduly reducing the track clearance. See also Fig. 2.

It is only with wheels of twelve inch diameter or less, that the reinforced outside axle boxing, which may, in extreme cases, entirely replace the lower flange of side sill under the axle, and Z-bar side sill construction, shown in Fig. 7, is of material advantage.

The horizontally split inside roller bearing boxing, shown in Fig. 9, may be said to consist of the upper bearing 133, and its face plate, 392, the lower bearing 134, and its face plate 393 (see Fig. 4), the rollers 42 and their runway 43; the upper face plate, at least, being bolted instead of riveted, to the side sill 231, so that it may be removed for examination or replacement of bearing; the bolts 44 (see also Fig. 4), passing through the upper and lower bearings, the cross channel 45 which maintains the alinement of the bearings parallel with the axles 14, and through the lading bottom 24. The upper and lower bearings are also provided with interlocking semi-annular extensions 412 and 413, respectively, see also Fig. 4.

The plain bearing unsplit boxing shown in Fig. 10, consists of the bearing proper 135, its face plate 394, the face plate horizontal extension 401, in the form of base plate also integral with the lower part of the bearing, and the bearing interlocking extension 414. The face plate is bolted to the side sill 235, the base plates resting in and bolted to both the cross alinement channel 451 and to the lading bottom 24. The side sill is bored to neatly receive the bearing interlocking extension 414, see also Figs. 11 and 12, thus relieving the boxing attaching bolts of both the weight of the car and of the dumping shock.

The plain bearing boxing shown in Figs. 13 and 14, is similar to that shown in Figs. 10, 11 and 12, except that the face plate 395 has two horizontal forward extensions 402, as shown in Fig. 14, symmetrically placed with respect to the center of the axle 14, also integral with the bearing 136, and serving as alinement faces.

The roller bearing axle journal boxing shown in Fig. 15 horizontally split at the level of the center of the axle 14, is similar to that shown in Figs. 13 and 14, except that the upper and lower bearings 137 and 138, respectively, have each their own alinement faces 403 and 404, respectively, also integral with their respective face plates 396 and 397, the upper and lower alinement faces being disposed just above and below the axle center, respectively. The cylindrical rollers 42 are within their runway 43 which in turn, is within the upper and lower bearings 137 and 138, respectively. Side sill reinforcement to compensate for metal removed for the axles is evidently an important function of all the boxings shown herein, and is essential to successful operation.

Cross bracing

My traction truck is substantially a horizontal plate girder with the web plate attached to one set of the edges of its flanges, instead of to their centers. As my truck will more commonly be approximately ten feet in the clear length, there should be say two struts and ties conveniently adjacent to the axles between the side flanges or side sills to maintain their vertical position under stress.

As shown in Fig. 2 an inverted U-shaped cross brace 46 on either side of the axle 14 so as to merely clear the same safely, its lower outwardly flanged edges riveted to the car bottom 24 the ends of the upper horizontal portion level with the tops of the side sills 23, connected to the tops of the side sills by the riveted connecting plates 47, extends parallel to the axles the clear width between the side sills. See also Fig. 8.

The cross brace just described, the details of which may be suitably varied, may also be used with inside axle boxings. With inside axle boxings, the boxings may also serve as one of the elements of the cross brace.

With the inside boxings shown in Figs. 4 and 9, the alinement channel 45 is evidently so connected with the side sills 231, by means of the upper and lower bearings 133 and 134, respectively, and face plates 392 and 393, respectively, that the alinement channel also serves as one of the elements of the cross brace. The inverted U-shaped axle housing 48, its upper semi-circular portion concentric with the axle, with its lower outwardly flanged edges bolted to the alinement channel and lading bottom, serves rather to merely stiffen vertically the alinement channel between the boxings.

The cross brace shown in Figs. 10 and 11 is substantially the same as that immediately above described, but as applied to a plane bearing inside boxing, the axle housing 481 being bolted to the boxing base plates 401, the alinement channel 451 and the lading bottom 24, with the filler 49 of the same thickness as the base plates and placed midway between the same.

The removable horizontally split axle tube 50, shown in Figs. 13—18, in connection with inside boxing, consists of the upper and lower semi-tubes 50 and 501, respectively, each flanged longitudinally and at their ends; the longitudinal or side horizontal flanges between the boxings being bolted tightly together to exclude dirt; the vertical end flanges of both upper and lower semi-tubed being also bolted to the boxing face plate 395. At the boxings, the upper and lower side flanges pass above and below respectively, the boxing alinement plates 402, and are securely bolted thereto. See also Figs. 13 and 16. In Fig. 15 are shown the upper and lower semi-tubes 502 and 503, respectively, their end flanges bearing against the upper and lower face plates 396 and 397, respectively, of the horizontally split roller bearing axle journal boxing previously described.

The semi-tube side flanges and their contained boxing alinement faces may be placed at such other angles as vertical, see 504 and 505, Fig. 17, as best suits the desired design. The details of construction may also be largely varied. The inverted U-shaped semi-tube 506, Fig. 53, may be described as consisting of a central semi-circular portion both ends of which are extended vertically downwards, and then outwardly from each other, so as to form horizontal flanged joints with the lading bottom 24. The inverted U-shaped semi-tube may also consist of the two quarter tubes 507 and 508, Fig. 52 suitably united by their central flanges on either side of the boxing alinement face 405.

The semi-tubes 50 and 501, Fig. 13, may evidently be so lengthened with outside boxings, as to be attached directly to the side sills 236, which also applies to the several forms of sectional tubing, shown herein; and will thus still serve but to a less degree, to maintain the vertical position of the side sills, under stress.

The inside boxings, Figs. 13, 14 and 15, for example, may be said to have, in addition to their side sill bracing functions, two other distinct functions, that of axle journal boxings and also that of serving, with the semi-tubes to more securely maintain the vertical position of the side sills under stress.

Draw-bars

The tractive haulage strains are transmitted to the truck shown in Fig. 2 by means of the upper and lower draw-bars 121 and 122, respectively, riveted to the top member of the end beam, midway between the side sills, with their rear ends extended downwardly so as to be also riveted to the rear end beam member, see also Fig. 20.

The draw-bars 123 and 124, Fig. 4, are passed through the top end beam member and down the back of the front end beam member, so as to be riveted thereto, see also Fig. 23. The draw-bars 125 and 126, Fig. 5, are again riveted to the top member of the end beam, their downwardly extended rear ends being riveted to the rear end member, see also Fig. 26.

The coupling pins 51, Fig. 2, pass through the draw-bars and the coupling link 52.

The diagonal end brace 37, Fig. 19, may be described as conforming to the front vertical face of the lower draw-bar 122 from the edges of which it extends diagonally, either way, to meet the side sills 23, to which it then conforms so as to be securely riveted thereto. See also Fig. 20. This position has been selected in part for the purpose of illustration, and also in part, because it is highly effective in transmitting to the side sills the tractive haulage strains, while also equally effective in transmitting the compressive haulage strains.

The diagonal braces shown elsewhere herein, are similarly placed to that in Fig. 19, except that shown in Figs. 6 and 26, in which the strut 38 is introduced between the diagonal brace 373, and draw-bars 125 and 126, thus transmitting to the diagonal brace the tractive haulage strains delivered through the draw-bars.

Bumpers

The bumpers may be of any form suitable for the purpose, as for instance, the sheet metal facings 111, Fig. 2, with wood backing 112; the ship channel 25 serving as an admirable bumper receiver. See also Figs. 19 and 20. The bumper shown in Fig. 2, is termed the high bumper for the reason that its top is level with that of the old type high bumper 11 of the all-wood car, see also Fig. 1. The relatively low bumper shown in Fig. 4 and consisting of the face plate 113 and its backing 114, is so termed because its top is not high enough above the rail 4 to safely permit its working against the high bumper 11, Fig. 2; its height being that which is most economical in design. But by making the wheels, 152, of the car of Fig. 4 higher, the bumper, 113, will fully work against the old type bumper, 11, of Fig. 5.

The height of the old type bumper 11, Fig. 1, above the rail 4, depends largely upon the diameter of the wheels 15 relative to the wheels 151 and 152, Figs. 2 and 4, respectively, which are large diameter wheels, while the wheels 153, Fig. 5 are of somewhat smaller diameter.

With small diameter wheels, as in Fig. 5, the bumper consisting of the face plate 115 and backing 116, may still be a high bumper, in the sense that its top is level with the top of the old bumper 11, and yet be also of itself economical in design.

If the wheels of two cars are of the same diameter, the axles of the two cars will be in the same horizontal axle plane. If one car has a low or under lading bottom, (Figs. 2, 4 and 5 of my drawings), it needs a bumper low enough to protect that bottom from obstructions which reach above the height of the low floor on the rail track traversed by the car, the bumper serving to meet such an obstruction and stop the car and prevent the car from moving partially over, and then resting on, the obstruction, the car being stalled by the obstruction and the bottom perhaps injured. But the bumper should extend downward only far enough to give the low bottom such protection. Thus, in the low bottom car, the bumper performs two functions: (1) to meet impact with other cars, and (2) to control the car relative to obstructions on the rail track.

If the other car has an upper lading bottom, that car will need a bumper approximately in the plane of the lading bottom of that car.

If the side sills of the low bottom car extend farther above than below the axles of that car, then the upper parts of the side sills can be brought into approximate alignment with the bottom and the bumper of the high-bottom car (Figs. 2 and 5—left hand ends); and if the bumper of the low bottom car extends from the level of the lower parts of the side sills of that car upward to the level of the lower parts of those abnormally upward-extended side sills, that bumper will be in substantial alignment with the bottom and the bumper of the upper bottom car, so that the bumpers of the two cars may work against each other.

For convenience in description, we note that the horizontal plane in which lie the axes of the axles is herein termed the axle plane; and that the space between two horizontal planes, one touching the upper face of the axles and the other touching the lower face of the axles, is termed the axle zone. It will be seen that the lower car bottom in Figs. 2, 4 and 5 of my drawings is substantially below the axle zone, while in Figs. 1 and 3 of the drawings, illustrating the old type car, the bottom 10 is above the axle zone, and the bumpers 11 of that car are also substantially above the axle zone.

From the foregoing comment it will be seen that to adapt my improved car to work with an old type car having the bottom above the axle zone and having the bumpers at least in part above the axle zone, the bumper in my car must reach or extend farther above the axle zone than would be necessary if it were used with cars made like itself, and must preferably also reach downward far enough to protect the bottom of my improved car, as shown in Figs. 2, 4 and 5, and as already described, abnormal heights of bumper face are therefore required to make my improved car work with the old cars in use. Also the coupling means on my improved car must be raised abnormally high to permit horizontal coupling with old cars of the high floor type.

In Figs. 2, 4 and 5 the side sills extend downward below the axle zone to the car bottom, and the side sills extend abnormally high upward above the axles and approximately to or above the height of the bumpers. This allows building the end structure of a height approximately equal to the height of the side sills and also high enough to receive a bumper extending below the axle zone and also above the axle zone into position to work with the bumper of an upper bottom car, as shown in Figs. 2 and 5.

It will be noted in Fig. 6, that the bumper face plate 115, is a curved metal arch, commonly one half inch thick, riveted to the end beam, similar to the face plate 115, Fig. 33, and therefore serving to distribute the compressive haulage strains over a considerable portion of the end beams, and thus greatly increasing their resisting power. This riveted curved face plate, is therefore an element of the end beam construction in addition to serving as a bumper face plate.

Deflector plates

The trucks previously described, have been for side wise dumping cars, the addition to which of bumper and axle deflector plates will convert same into end dump cars. For end dump cars, both low bumpers and low cross bracing, in so far as consistent with the desired design, are of evident advantage in that the height of the deflector plates is proportionately reduced.

Fig. 5 shows a car of the permanent end dump type which represents a certain economy in material over the convertible car. The bumper deflector plate 53, is attached along its upper edge to the top face plate 272, and along its lower edge to the lading bottom 241, a short section extending only from the foot of the deflector plate to the forward foot of the axle deflector plate 54. See also Figs. 25, 26 and 27.

The axle deflector plate 54, Fig. 5, is supported by the lading bottom 241 at its lower end, and is rigidly attached thereto; the sloping portion which is the deflector plate proper, is extended horizontally forward at its upper forward end, until it has passed beyond the axle, and then is extended down to the top of the lading bottom where it is again extended horizontally forward sufficiently to form a footing riveted to the lading bottom. The angle connecting plates 55 are riveted to the top horizontal portions of the deflector plates 54, and the vertical flanges of said angle plates are riveted to the vertical faces of the side sills 232. This form of axle deflector plate, therefore, has a double function that of an axle deflector plate and that of side sill cross brace. See also Fig. 7.

The lower rear end of the removable axle deflector plate 541, Fig. 18, is attached to the lading bottom 24 by nuts and bolts; the forward upper end of the deflector plate proper where it begins to rest on the upper semi-tube 50, is extended forwardly, conforming to the shape of the upper semi-tube, so as to be bolted with it to the lower semi-tube 501, as shown.

The bumper deflector plate may evidently also be attached by nuts and bolts or otherwise, so as to be removable, the lading bottom, however, in that case, being continuous throughout the length of the car, as in Fig. 4.

The convertible car is suitable for new mines temporarily equipped with end dumps, until sufficient output is gained to warrant changing to sidewise dumping. The two lading wings of the old type car, see Fig. 3, are supported by the continuous flat belts or binders 19, which in their center pass underneath and are attached to the car bottom 10. The lading wings of my new car, as shown in Fig. 2, are supported by the five pairs of sectional flat belts 191, in part due to its greater length.

Belts

The belts 192, Fig. 4, 193, Fig. 5, 194 Fig. 13, 195, Fig. 47, and 196, Fig. 49, are all similar flat sectional belts with certain variations in details but may be channels or other structural forms suitably bent or braced.

As shown in Fig. 2, the inside belts 191, are attached at their lower ends, to the inner faces of the side sills 23. The belts 194, Fig. 13, 195, Fig. 47, and 196, Fig. 49, are similar inside belts.

As shown in Fig. 4, the outside belts 192 are attached also at their lower ends to outside faces of the side sills 231. The belts 193, Fig. 5, and 194, Fig. 13, are similar outside belts.

The side sills serve admirably for the attachment of the belts which do not extend across underneath the car bottom, as in the old type car.

The inside main belt 191, Fig. 46, may be greatly strengthened by the secondary belt 197 extending diagonally from the under side of the horizontal portion of the main belt, to the lower part of the channel sill 23, and suitably attached at either end. See also Fig. 51. The outside main belt 193, Fig. 7 may be similarly reinforced by the secondary diagonal belt 198, see also Fig. 5.

Sectional siding

The simplest form of demountable sectional siding is that shown in Fig. 46, the inner and outer vertical and wing bottom plates 161, 171 and 181, respectively, which may be termed the inner and outer plates, and the wing bottoms of approximately equal width so as to be more readily handled, being simply lapped and removably secured to each other and to the side sills 23, by nuts and bolts instead of by rivets. The inner plate 161 has a top outer extension serving as part of the wing bottom, merely to reduce the width of the wing bottom 181, and thus render it more easily handled. The lower part of the inner plate 161 is bent outwardly on either side of the belt 191 so as to conform to the vertical face of the side sill 23 to which it is bolted. See also Fig. 2. These three sheets, when distorted and bent (as by a fall of roof rock 1, Fig. 3) may evidently, when separated, be much more readily re-formed and put back together, in an ordinary shop than if they had been so securely riveted together as to form practically one sheet.

With nuts and bolts, the smallest size that is exactly right for the desired thickness of plate may be used, without inconvenience, whereas, with rivets three eighths of an inch is the smallest size convenient to use, which however, will more usually tear holes in the three sixteenths inch plate commonly used before the heads can be jumped off. Even for the same sizes it is some easier and also requires less skill, to cut even badly rusted nuts than to jump off the heads of rivets.

What may be termed the double lap joint, shown in Fig. 47, consists of the outer plate 172, and its parallel lap strap or plate 173, their lower edges flush with each other, and such distance apart as to readily receive the upturned outer edge of the wing bottom 182, the upper part of the lap plate being bent toward the outer plate, that it may be attached thereto, by the rivet 59, the cotter pin 60, passing through the three plates forming one variety of double lap joint. The inner plate 162 is similarly connected to the wing bottom; its lower edge resting loosely between its lap plate 163 intended to protect it from being torn off, by the emptying of the lading, and the belt 195 to which is bolted the lap plate 163. See also Figs. 4, 5 and 50.

The horizontal double lapped joint shown in Fig. 48, is similar to that just described, except that the riveted double lap is in the wing bottom 183 and of sufficient height, to readily receive the doubled back horizontal lower edge of the outer plate 174, thus giving the same total thickness of metal, at the joint, for both plates, through which is passed the wire nail 61. The inner portion of the wing bottom may be said to conform to the belt 192, and the upper flange of the channel 231, its extreme inner edge being bent down, so as to rest loosely between the upper edge of the channel, and the inner lap plate 164, riveted to the channel, flush with its top.

The double lap joint shown in Fig. 49 consists of two symmetrical horizontal bends in opposite directions, of the inner edge of the outer plate 175 and of the wing bottom 185 such that each bend will readily receive the free edge of the other plate, the wire staple 62, passing through both plates adjacent to the joint with its ends bent inwardly, so as to lock the joint in working position. Both the outer plate and the wing bottom, may be attached to the belt by the cotter pins 60, or other suitable means, so as to be readily removable.

The tops of the wheels 151, 152, 153, and 154, Figs. 2, 4, 5 and 13, respectively, are all below their wing bottoms. However, where thin coal is being mined, it will often be desirable to have the wing bottom 185, Fig. 49, below the top of the wheel 155, the wing bottom being suitably recessed over the wheel, to readily permit its rotation.

Washers, fillers, or even filler strips, cost much less than the bending otherwise necessary either in the main or in the strap plates, or in both. As shown in Fig. 49, the inner part of the wing bottom 185 is extended downwardly, so as to form the middle member of the inner vertical or sill double lap joint; the two flat lap plates 165, which may be exactly alike, forming the outer members; the outer circular washer 63 between the side sill 23, and the outer lap plate, and the inner washer between the two lap plates, being each of such thickness that the double lap joint thus formed, will readily receive the inner vertical edge of the wing bottom; the wire nail 61 passing through the three members of the lap joint attached to the side sill by the bolt 64.

The sill siding joint shown in Figs. 55 and 56 is substantially that shown in Fig. 49, except that the holes for the wire nails 61 have been put on the level of the bolt 64, the edge of the inner vertical part of the wing bottom 185 being suitably recessed to pass down over the inner washers 63 and between the inner and outer lap plates 165, the outer washer 62 being between the outer lap plate and the sill 23. The two lap strap joints may evidently be used for any of the other siding joints, one of the plates replacing the inside washer 63, Fig. 49.

As the sill siding joint is not in an exposed position, the two lap straps 166 and 167, Fig. 55, suitably bent to act as the sill joint without spacing washers, may be riveted along their lower edges, direct to the sill 23; the wire nail 61, serving to hold the wing bottom 185 in place.

The siding shown in Fig. 7 is substantially that in Fig. 49 except that the upper joint bend is enough above the lower joint bend, in the outer plate 176, that the bent back edge of the wing bottom 186 may be inserted and then dropped down, the lock bolt 63 locking same in working position.

If a loaded car becomes crushed, the sectional siding if placed on the outside of the belts, as in Fig. 13, may be much more readily removed than if placed inside the belts, as elsewhere shown herein, while some additional capacity will also be gained thereby, without appreciable increase in the overall dimensions. As shown in Fig. 13, the outer side 177 and the wing bottom 186 are united by the rectangular corner lap plate 178, all three plates being attached to the inside belts 194, and to each other, by nuts and bolts. Evidently, my sectional siding may be either inside or outside, or partly inside and partly outside the belts. What is termed herein, the double lap joint, is a siding joint in which at least one of the sheets forming the joint, is between at the joint at least two laps of the other sheet. The wing bottom 182, Fig. 47 for example, may also have riveted along its outer edge, a rectangular corner lap plate similar to the corner plate 178, Fig. 13 which may interlock with the outer plates 172 and 173, Fig. 47.

Figs. 47 and 48 rather more clearly illustrate the spirit and scope, not merely of my sectional siding, but also, of my traction truck, in that the siding sheets 162 and 183, respectively, are not even attached to the sills 235 and 231, respectively, and cannot therefore, take any appreciable part in transmitting the haulage strains.

The several constructions of lap joints shown herein, whether single or multiple, horizontal or vertical, may be used interchangeably with each other, or with others within the spirit and scope of my invention not merely to the sides and wing bottoms, of the lading holding body, but also to its ends. As shown in Fig. 6, the end sheet 201 may be turned in at its ends inside the side sheet 176 so as to hold the side sheet in position, thus forming a vertical lap joint, see also Fig. 5. The end sheet lap joint shown in Fig. 9, between the upper end sheet 202, and the lower end sheet 203 is substantially the sill siding joint shown in Fig. 56, but inverted; the spacing washers, see dotted circles 62, and the flat lap plate 165 riveted to the lower edge of the upper plate, between the sills, the wire nails 61 passing through the upper sheet, its lap plate, and the upper edge of the lower plate, between the two; the ends of the upper sheet, being turned inwardly, so as to form a vertical lap joint, as in the case of the end sheet 201. See also Fig. 4.

*Narrow gauge cars*

In some of the older mining districts, track gauges as narrow as thirty six inches are still common enough, owing to extensive narrow gauge equipment purchased before the advantages of the wider gauges became better understood. If the car is constructed with the wheels located at the outer sides of the sills 23, for a thirty six inch gauge track, the side sills will be say twenty six inches apart, not only seriously reducing the truck lading space, but also seriously increasing the overhang of the wings, both of which may be obviated materially, by placing the wheels 156, see Fig. 51, inside the sills 23, which is a thoroughly practical construction, although the efficiency of operation of the car is somewhat reduced thereby, in part for the reason that the car is not then so readily re-railed, while the wheels require such covering that the lading will not prevent their rotation.

Outside sills may also be used, with the wider gauges. With a forty eight inch gauge and outside sills, a mine car six feet wide at the top, will still be a wing type mine car.

*Metal beams for side and end sills*

The I-beam 56, Fig. 36, may be said to be typical of the metal beam, the essential members of which are, the upper and lower horizontal members, and the vertical connecting member. The I beam may be said for purposes for which it is designed, to represent the maximum strength per pound of metal. When used for side sills, the upper inner flanges interfere somewhat with the emptying of the lading which may be obviated by the use of the channels, Figs. 37 to 41 inclusive, or the Z-bars, Figs. 42 to 45 inclusive, which suitably placed, may be used interchangeably for either side or end sill construction.

Fig. 37 shows the structural channel 57, Fig. 38, the ship channel 571, and Fig. 39 the pressed channel 572. The built up channel shown in Fig. 40, consists of the vertical web plate 573, the upper and lower angles 574 and 575, respectively, suitably riveted to the web plate, on the same side, so that their upper and lower faces are flush with the upper and lower edges, respectively, of the web plates. The built up channel shown in Fig. 41, consists of the upper and lower angles 576 and 577, respectively, their vertical legs suitably riveted together so as to form a built up web plate.

Fig. 42 shows a rolled Z-bar 58 and Fig. 43 a pressed Z-bar 581. The built up Z-bar shown in Fig. 44, consists of the web plate 582, with the upper and lower angles 583 and 584 respectively, riveted flush with its edges but on opposite sides. The built up Z-bar shown in Fig. 45 consists of the upper and lower angles 585 and 586, respectively, with their vertical legs so riveted as to form a built up web plate but their vertical horizontal legs on opposite sides of the web plate.

These, and other similar forms, may be used, either singly or in combination, as with face or web plates, in accordance with the well known principles of structural steel designing, as may best suit the stock of material, or shop equipment immediately available at the time of construction for either side or end sills.

The channel 57, Fig. 37, may be considered the I-beam 56, Fig. 36, from which those portions of the flanges on the right side of the vertical member, as shown, have been removed. If therefore, we term the I-beam, a fully flanged metal beam, we may then term all the channels, semi-flanged metal beams which have their semi-flanges on the same side of the web plate; the Z-bars being termed semi-flanged beams in which the semi-flanges are on opposite sides of the web plates.

It is evident that various changes, modifications and variations might be resorted to, that parts might be omitted and features added, all without departing from the spirit and scope of my invention, and hence, I do not wish to limit myself to the exact disclosures hereof.

What I claim is:

1. In mine and other cars, the combination of side sills, box girder end sills fixed to the side sills and provided with draw-heads fitted to and riveted on the top and inner faces thereof.

2. In mine and other cars, the combination of side sills, and end sills connecting and fixed thereto and embodying front and rear beams and top and bottom facing plates, said end sills provided with bumpers and draft means, whereby said sills receive the haulage strains.

3. In mine and other cars, the combination of side sills, and end sills connecting and fixed thereto and embodying front and rear beams and top and bottom plates, the lading floor constituting the bottom facing plates of said end sills.

4. In mine and other cars, the combination of structural side sills, structural cross beams fixed to and connecting the side sills, diagonal V-bracing between the end portions of the side sills, and a bracing lading floor, said V-bracing being fixed to the floor and to the side sills.

5. In mine and other cars, the combination of a traction truck embodying side and end sills, a lading floor fixed to said truck, car wheels, axles extending through the side sills, axle boxings fixed to said side sills and arranged at the inner sides thereof and within the car, and cross bracing between the side sills to cover the axles and boxings.

6. In mine and other cars, the combination of a traction truck embodying side sills and end sills, a lading floor, car wheel axles extending through the side sills, and sectional removable cross bracing between the side sills and extending above the general level of said floor and covering the axles.

7. In mine and other cars, the combination of a traction truck provided with supporting metal side sills consisting of vertical members and horizontal semi-flanges disposed above and below the car axles, sheet metal side sill bracing lading bottoms suitably attached to the side sill lower semi-flanges, together with internal box girder end beams suitably connected to the side sills.

8. In mine or other cars, the combination of side sills, car axles disposed between the upper and lower portions of the side sills, end beams of the box girder type suitably attached to the side sills, and sectional body belting suitably attached to the side sills.

9. In mine and other cars, the combination of longitudinal supporting side sills, box girder end sills secured to the side sills, and a stationary lading floor secured to the lower portions of the side sills and also serving as the lower horizontal member of the box girder end sills, the upper horizontal member of the box girder end sills being a sheet metal plate secured to the upper portions of the side sills.

10. In mine and other cars, the combination of metal beam side sills and box girder end beams secured together, a stationary lading bottom secured to the bottom portions of the side sills, together with flat vertical end sill bracing members extending diagonally to the side sills on either side and secured thereto.

11. In a mine or similar rail car, the combination of metal side sills and box girder end sills secured together, a stationary lading bottom secured to the lower portions of the side sills, bumper members secured to said end sills, and bumper filler blocks between said bumper members and said end sills.

12. In a mine or similar rail car, the combination of metal side sills, a stationary lading bottom secured to the lower portions of the side sills, and diagonal end bracing members secured to the said lading bottom.

13. In a mine or similar rail car, the combination of metal side sills, a stationary lading bottom secured to the lower portions of the side sills, and diagonal end bracing members secured to the said lading bottom and to the said side sills.

14. In a mine or similar rail car, the combination of semi-flanged metal side sills disposed closely adjacent to the car wheels, car axles disposed between the upper and lower semi-flanges of the side sills, internal braced end beams of the box girder type suitably attached to the side sills and provided with bumper and coupling means, together with formed sheet metal side sill cross braces adjacent to the car axles.

15. In a mine or similar rail car, the combination of axles, wheels supporting the axles, a stationary lading bottom substantially below the axle zone, and an end structure having bumper means having a continuous upright bumping surface extending farther above than below the axle zone, said bottom being rigidly secured to said end structure below said zone.

16. In a mine or similar rail car, the combination of axles, wheels supporting the axles, a stationary lading bottom substantially below the axle zone, an end structure having bumper means having a continuous upright bumping surface extending farther above than below the axle zone, and coupling means above the bumper means, said bottom being rigidly secured to said end structure below said zone.

17. In a mine or similar rail car, the combination of longitudinal side sills, axles extending through the side sills, wheels supporting the axles, a stationary lading bottom substantially below the axle zone and extending between and rigidly secured to said side sills, and bumper means extending farther above than below the axle zone.

18. In a mine or similar rail car, the combination of longitudinal side sills, axles extending through the side sills, wheels supporting the axles, a stationary lading bottom substantially below the axle zone and extending between and rigidly secured to the side sills, bumper means extending farther above than below the axle zone, and coupling means above the bumper means.

19. In a mine or similar rail car, the combination of longitudinal side sills, axles extending through the side sills, wheels supporting the axles, a stationary lading bottom substantially below the axle zone and extending between and rigidly secured to the lower parts of the side sills, and bumper means extending abnormally above the axle zone.

20. In a mine or similar rail car, the combination of axles, wheels supporting the axles, an end structure, a stationary lading bottom substantially below the axle zone and secured to said end structure, bumper means included in said end structure and extending below the axle zone substantially to the level of the lading bottom and extending above the axle zone substantially to the height of bumper means placed in relation with a lading bottom located above the axle zone in a similar car.

21. In a mine or similar rail car, the combination of longitudinal side sills, axles extending through the side sills, wheels supporting the axles, a stationary lading bottom located and rigidly secured to the side sills substantially below the axle zone, bumper means extending below the axle zone substantially to the level of the lading bottom and extending above the axle zone substantially to the height of bumper means placed in relation with a lading bottom located above the axle zone in a similar car.

22. In a mine or similar rail car, the combination of axles, wheels supporting the axles, an end structure, a stationary lading bottom below the axle zone and secured to said end structure adjacent the lower part thereof, bumper means extending upward from near said bottom to approximately the height of high bumper means located above the axle zone in a similar car for cooperation with said high bumper means.

23. In a mine or similar rail car, the combination of longitudinal side sills, axles extending through the side sills, wheels supporting the axles, a stationary lading bottom below the axle zone, bumper means extending below the axle zone and above the axle zone to substantially the level of the upper part of the side sills, and coupling means extending across the upper part of the bumper means, whereby the coupling means are placed above the horizontal plane of the upper faces of the side sills.

24. In a mine or similar rail car, the combination of longitudinal side sills, axles extending through the side sills, wheels supporting the axles, a stationary lading bottom substantially below the axle zone and secured to the side sills, bumper means extending above the axle zone, and coupling means above the bumper means, the height of the bumper means being sufficient to allow bringing the coupling means outside the space enclosed by the horizontal planes of the upper and lower faces of the side sills.

25. In a mine or similar rail car, the combination of axles, wheels supporting the axles, an end structure, a stationary lading bottom substantially below the axle zone and secured to said end structure, bumper means extending to both sides of the axle zone, and coupling means supported rearward of the bumper means and extending outward above the bumper means.

26. In a mine or similar rail car, the combination of longitudinal side sills, axles extending through the side sills, wheels supporting the axles, a stationary lading bottom substantially below the axle zone, and an end structure connecting the side sills and comprising a bumper with an upright bumping face extending from substantially the height of the lading bottom and extending above the axle zone and having its top substantially at the level of the tops of the side sills, said bottom being secured to said side sills and end structure.

27. In a mine or similar rail car, the combination of longitudinal side sills, axles extending through the side sills, wheels supporting the axles, a stationary lading bottom substantially below the axle zone, an end structure connecting the side sills and comprising a bumper with an upright bumping face extending below the axle zone substantially to the height of the lading bottom and extending above the axle zone to the height of the side sills, and coupling means above the bumper, said bottom being secured to said side sills and end structure.

28. In a mine or similar rail car, the combination with side sills and a low stationary lading bottom rigidly secured to the side sills, of an end structure having its top substantially level with the top of the side sills, and a pair of superimposed draft members extending outward approximately horizontally above the end structure.

29. In a mine or similar rail car, the combination of longitudinal side sills, axles extending through the side sills, wheels supporting the axles, a stationary lading bottom substantially below the axle zone, a horizontal box girder end structure joining the ends of the side sills, and a bumper with an upright bumping face supported by the box girder and the said bumping face extending upward above the axle zone to the height of the upper part of the side sills.

30. In a rotary-dump wing-type mine or similar rail car, the combination of axles, wheels supporting the axles, a stationary lading bottom substantially below the axle zone, wing side walls including stiffening means above the level of said bottom, said bottom being secured to said stiffening means, stationary end walls between the ends of the side walls and secured to said walls, and bumper means extending abnormally above the axle zone to match up with a car having its lading bottom above its axle plane.

31. In a mine or similar rail car, the combination of side beams, an end structure including an upright coupling pin aperture approximately in the transverse center of the said end structure, a draw-bar apertured above said aperture, car axles above the plane of the lower edges of the said beams, together with a stationary lading bottom secured to said end structure below the plane of the tops of the car wheel axles.

32. In a low-bottom mine or similar rail car, the combination of axle journals, wheels, suitably supported end structures, a stationary central lading bottom at least a substantial part of which is below the plane of the tops of the axle journals and which is connected to one said end structure below said plane, high bumper means attached to said end structures, and a coupler attachment means above said one end structures, whereby the said low-bottom car is adapted to suitable operative bumping and coupling relationship with a high-bottom car having wheels of the same diameter.

33. In a mine or similar rail car, the combination of axle journals, suitably supported longitudinal side sill members, cross end sill members, a stationary central lading bottom at least a substantial part of which is below the plane of the tops of the axle journals and is secured to said side and end sill members, and a projecting transverse bumper means supported by said cross end sill member and having an upright bumping face extending higher above the horizontal plane of the centers of the axle journals than the main portions of the side sill members extend below the said journal plane.

34. In a mine or similar rail car, the combination of car wheels, car axles, suitably supported side sills, cross end sill members, a central stationary lading bottom at least a substantial part of which is below the plane of the tops of the axles and is secured to said side and end sill members, bumper means supported by said cross end sill members and projecting beyond the lading body of the car and having coupling attachment means, and the said cross end sill members extending higher above the horizontal plane of the centers of the axle journals than the main portions of the side sills extend below the said axle journal plane.

35. In a low-floor mine or similar rail car, the combination of car wheels, car axles, suitably supported side sill members having substantially upright lower longitudinal sections, cross end sill members supported by the side sill members, a stationary central lading bottom at least a substantial part of which lies below the horizontal plane of the top of the journals of the car axles and also below the plane of the upper portions of the said upright sections of the side sill members, said part being secured to said side and end sill members, bumper means projecting beyond the lading body of the car and supported by said cross end sill members and having bumping faces with top edges at least as high as the plane of the tops of the said upright sections of the side sill members, and a coupling link so located that when in its horizontal position for coupling the horizontal plane of its upper portions is substantially above the horizontal plane of the tops of the said upright sections of the side sills.

36. In a mine or similar rail car, the combination of longitudinal sides having lower upright sections which serve as load supporting sill members, car axles having journals whose centers lie in a horizontal plane cutting the said upright sections below their centers, a stationary lading bottom having at least a substantial portion of its under surface below the horizontal plane of the tops of the axle journals, said portion being secured to the sill members below said plane, and end bumper means projecting beyond the end of the lading body of the car.

37. In a mine or similar rail car, the combination of load supporting side sill members having substantially upright longitudinal sections, car axles the centers of whose journals lie in a horizontal plane cutting the said upright longitudinal sections of the side sill members substantially below their centers, end sill structures extending upward to a level that is approximately even with the horizontal plane of the upper portions of the upright sections of the side sills and including bumper means, and a stationary lading bottom at least a substantial part of which lies below the horizontal plane of the tops of the journals of the car axles and secured to low parts of the side sill members and end sill structure.

38. In a low-floor mine or similar rail car, the combination of wheels, metal side lading retaining members having substantially straight and upright longitudinal lower wall-sections which are stiffened by sidewise projections and which serve as lading body load supporting means, car axle journals whose centers lie in a horizontal plane cutting the said upright lower wall-sections of the side members substantially below their centers, a lading bottom at least a substantial part of which lies below the horizontal plane of the tops of the axle journals, end sills connected with and supported by the side members, a projecting bumper means attached to one of the said end sills and having an upright bump-resisting face extending upward substantially to the horizontal plane of the tops of the said lower wall-sections of the said side members whereby the said bumping face approximately reaches the level of the top of the bumping face of a bumper on a high-floor car having wheels of the same diameter as those of the low-floor car and having a central lading floor above its axle journals, together with a suitable coupler attachment means whereby the low-floor car may be suitably connected in operative relation with the said high-floor car.

39. In a low-floor mine or similar rail car, the combination of car axle journals, car wheels, suitably supported side sill members having substantially upright longitudinal wall-sections, cross end sill members, a stationary lading bottom at least a major part of which lies below the horizontal plane of the tops of the car axle journals and secured to low parts of the end sill members, bumper means supported by the cross end sill members, and a coupler attachment means extending above one of the bumper means whereby the coupling link when in operative position will have its upper portions lying in a horizontal plane which is farther from the horizontal plane of the centers of the car axle journals than the distance from the said journal plane to the horizontal plane of the lower portions of the upright walls of the side sill members and whereby the said car is adapted to be coupled to a high-floor car having its lading bottom above the tops of its car axle journals, and having wheels of the diameter of those of the low-floor car.

40. In a low-floor mine or similar rail car, car axles, car wheels, a metal lading bottom at least in substantial part disposed below the axles, straight side sill sections with substantially upright longitudinal walls, end sills suitably connected with the side sill sections, said part being secured to said sill sections, and a coupling means having portions which reach substantially above the horizontal plane of the tops of the said upright longitudinal walls so as to permit the substantially horizontal coupling of the low-floor car with a high-floor car having its floor above its axles and having wheels of the diameter of those of the low-floor car.

41. In a low-floor mine or similar rail car, the combination of car wheels, straight side sill members, an end traction structure supported by the side sill members, and a stationary lading floor secured to said end traction structure at the lower part thereof, and the said traction structure itself including a bumper member and a coupler attachment means so located that the car is adapted for operative bumping and coupling relationship with a high-floor car having wheels of the same diameter as those of the low-floor car.

42. In a low-floor mine or similar rail car, the combination of side sill members, car axles whose journal centers lie in a horizontal plane cutting the side sill members, an end structure supported by the side sill members, a stationary floor structure located at and secured to the sill members at low parts thereof, a coupling link supported by the end structure and the plane of the coupling link when in coupling position lying substantially farther above the horizontal plane of the centers of the car axle journals than the distance from the said journal plane to the horizontal plane of the lowest portions of the side sill members whereby the said low-floor car can come into a suitable operative coupling relationship with a high-floor mine car having wheels of the same diameter as those of the low-floor car and having its coupling link lying above a lading floor which lies above the car axles of the high-floor car.

43. In a mine or similar rail car, the combination of straight side sill members, car axle journals whose centers lie in a horizontal plane cutting the side sill members, an end traction structure supported by the side sill members and including a flanged end metal sill member with a substantially upright wall, a pair of coupler attachment members engaging said end sill member and terminating in apertured coupling ends, the said attachment members extending above and outward of the said end sill member, and a lading bottom at least a substantial part of which lies below the horizontal plane of the tops of the car axle journals.

44. In a low-floor mine or similar rail car, the combination of car wheels, car axles, straight longitudinal side sill members having upright walls intersecting the horizontal plane of the centers of the journals of the car axles, a stationary lading bottom having parts which are substantially level with the lowest horizontal plane of the side sill members, an end traction structure supported by the side sill members and including a relatively narrow metal member for receiving and engaging a coupling link and the said coupling link lying above the horizontal plane of the upper portions of the upright walls of the side sill members whereby the low-floor car can be coupled suitably with a high-floor car having wheels the diameter of those of the low-floor car and having its lading bottom above its axles.

45. In a mine or similar rail car, the combination of a lading body, side sill members and a metal end sill member in secured relationship and forming a rectangular load-supporting traction truck frame, car wheels, car axles, a stationary lading bottom lying at least in substantial part below the horizontal plane of the tops of the journals of the car axles, and a metal member with an upright bumping face and having an approximately horizontal flange directed towards the lading body, and the said bumper member being rigidly secured to the metal end sill member.

46. In a mine or similar rail car, the combination of a lading body, side sill members, an end sill structure supported by the side sill members and including a metal member with an upright bumping face and the said metal member having flanges directed towards the lading body of the car, and the said flanges overlapping parts of the said end sill structure.

47. In a mine or similar rail car, the combination of a lading body, car wheels, car axles, longitudinal side sill members intersecting the horizontal plane of the centers of the journals of the car axles, a lading bottom lying at least in substantial part below the horizontal plane of the tops of the journals of the axles and also below the upper portions of the side sill members, a metal end sill member supported by the side sill members and having a flange directed away from the lading body, and a metal bumper member having a horizontal flange directed towards the lading body and the said horizontal flange overlapping the flange of the end sill member and rigidly secured to the same.

48. In a mine or similar rail car, the combination of a lading body, longitudinal load-supporting side sill members, car axle journals, a stationary lading bottom lying at least in substantial part below the plane of the tops of the car axle journals and also below the plane of the upper portions of the side sills, a metal end sill structure supported by the side sill members and including a metal member having flanges directed away from the lading body, and including also a metal bumper member with an upright bumping face and having horizontal flanges directed towards the lading body and extending between and overlapping the said metal member flanges and being rigidly secured to the said flanges.

49. In a mine or similar rail car, the combination of a lading body, car axles, a lading bottom at least a part of which lies below the horizontal plane of the tops of the journals of the car axles, and end structure including a flanged metal member having its flanges directed away from the lading body and including also a metal bumper member with an upright bumping face and with horizontal flanges directed towards the lading body, and the said bumper flanges overlapping and being rigidly secured to the flanges of the said metal member, and a wood filler member between the upright face of the bumper member and the said flanged metal member.

50. In a low-floor mine or similar rail car, the combination of car wheels, car axles, a frame extending above and below the axles a stationary lading bottom at least a part of the lower surface of which lies below the horizontal plane of the bottoms of the journals of the car axles and secured to said frame below said plane, a bumper member at one end of the frame having an upright bumping face extending approximately to the height of the top of the floor of a high-floor car having a wood lading bottom above its axles and having its wheels of the diameter of those of the low-floor car.

51. In a mine or similar rail car, the combination of wheels, side sills having sidewise top extensions, end traction structures attached to the side sills and including transverse horizontally extending metal top members, and a metal plate lying in approximately a horizontal plane and rigidly secured to the upper portions of the side sills and also secured to said metal top members, and a bumper means.

52. In a mine or similar rail car, the combination of car wheels, car axle journals, side sill members having sidewise top extensions, a secured stationary lading bottom at least a substantial part of which lies below the horizontal plane of the tops of the car axle journals, end traction structures having horizontally extending transverse metal top members, a metal plate lying in substantially a horizontal plane and rigidly secured to the upper portions of one of said side sill members, and also to one of said metal top members, and suitable bumper means.

53. In a mine or similar rail car, the combination of car wheels, car axle journals, a stationary lading bottom having at least a substantial part below the horizontal plane of the tops of the car axle journals, a supported end traction structure including a transverse metal member which has an upright wall and also a horizontal flange, and the said traction structure including also a flanged bumper member and a plate which extends transversely between the side sills, and the said plate being rigidly secured to said flanged end sill member and also to the said flanged bumper member.

54. In a mine or similar rail car, the combination of side sill members with upright walls, car axle journals whose centers lie in a plane cutting the upright walls of the side sill members below their centers, high end sills connected with the side sill members, a stationary lading bottom structure lying in substantial part below the plane of the tops of the car axle journals and in part extending substantially to the top of one of the high end sills whereby the said lading bottom structure is adapted to be secured to the upper part of said high end sill.

55. In a mine or similar rail car, the combination of car wheels, car axle journals, a lading bottom at least a substantial part of which lies below the horizontal plane of the tops of the car axle journals, and a traction truck frame having an end structure including a metal angle and a metal channel and a horizontal metal plate joined to said angle and channel and a wood filler member located in the channel.

56. In a mine or similar rail car, the combination of car wheels, car axle journals, a lading bottom at least a substantial part of which lies below the horizontal plane of the tops of the car axle journals, and a traction truck frame having an end structure including a metal angle structure secured to said bottom and a metal plate secured to and reinforcing said angle structure and a wood filler member located in said angle structure.

57. In an end sill structure for a traction truck frame of a low bottom mine or similar rail car, the combination of at least one metal angle member having a horizontal flange, a wood filler member in secured relationship to the angle member to provide a cushion for receiving bumping effects and to stiffen the same, and a bumper member overlapping said flange and wood filler member and having a metal bump-resisting face, said members being arranged to extend transversely of the car.

58. In a mine or similar rail car, the combination of car wheels, car axles, upright longitudinal side sill members, a lading bottom at least a substantial part of which lies below the horizontal plane of the tops of the journals of the car axles and also below the horizontal plane of the upper portions of the side sills, and a transverse end traction structure supported by the side sill members and including as transversely extending members a Z-form metal means, a metal angle member, means for connecting said metal means and angle member, and a wood filler member and also a metal bumper member overlapping said filler and angle members and having a bump-resisting face.

59. In an end sill structure for a traction truck frame for a low bottom mine or similar rail car, the combination of a metal angle, a metal channel, said angle and channel each having a horizontal flange, a metal plate connected to said flanges, a wood filler member to provide a cushion for receiving bumping effects, said angle, channel, plate and filler member being in secured relationship to one another and arranged to extend transversely of the car to provide a stiff end structure of the frame, and a metal bumper member having flanges arranged to be directed towards the lading body of the car and overlapping and engaging said filler member.

60. In a mine or similar rail car, the combination of side sill members, a lading body, an end traction structure in rigid relationship with the side sill members and including a metal bumper member having an upright bumping face and having flanges directed towards the lading body, and a horizontal metal wall securing said bumper member to said side sill members.

61. In a mine or similar rail car, the combination of a lading body, side sill members, an end traction structure joined to the side sill members and including a metal bumper member with an upright bumping face and having its flanges directed towards the lading body of the car, metal means lying at least in part in a horizontal plane and securing said bumper member to the said side sill members, and a bump-cushioning transverse wood member forming a part of said end structure.

62. In a mine or similar rail car, the combination of car wheels, side sill members with substantially upright walls, car axle journals whose centers lie in a horizontal plane cutting the upright walls of the side sill members substantially below their centers, a lading bottom having at least a substantial part lying below the plane of the bottoms of the car axle journals, a side lading wing bottom extending outwardly beyond the adjacent wheel gauge line in a plane that cuts the adjacent wheels, and bumper means.

DISCLAIMER 1,961,018.—*Audley Hart Stow*, Charleston, W. Va. MINE CAR AND THE LIKE.
Patent dated May 29, 1934. Disclaimer filed May 25, 1942, by the assignee, *Sanford Investment Company*.

Hereby enters this disclaimer to claims 7, 8, 10, 11, 14, 15, 16, 17, 18, 19, 20, 21, 22, 23, 24, 25, 26, 27, 28, 29, 30, 31, 34, 35, 36, 37, 38, 39, 40, 41, 42, 43, 44, 45, 47, 48, 49, 50, 51, 52, 53, 54, 55, 56, 58, 60, 61, 62, 65, 66, 67, 68, 69, 70, 74, 78, 80, 81, 85, 86, 89, 90, 91, 94, 95, 97, 100, and 103 of said specification.

[*Official Gazette June 16, 1942.*]

vertical wall of the angle member, and also a metal bumper member having an upright bump-resisting face and a horizontal portion overlapping said filler member.

90. In the end sill traction structure of the traction truck frame of a mine or similar rail car, the combination of a flanged end sill member with a substantially upright wall, a pair of coupler attachment members engaging said end sill member and extending above and outward of said end sill member and having ends apertured to receive a coupling pin, and the said coupler attachment members having their extensions spaced apart whereby they may receive a coupling link between them.

91. In an end sill traction structure of a traction truck frame for a mine or similar rail car having a lading body, the combination of a transverse metal end sill member and a metal bumper having a substantially horizontal flange directed towards the lading body of the car, and the said bumper member being rigidly secured to the transverse end sill member.

92. In an end sill traction structure for the traction truck frame of a mine or similar rail car having a lading body, in which the traction truck frame includes side sills extending lengthwise beyond the lading body, the combination of a flanged transverse metal member with a substantially upright rear wall adapted to be rigidly secured to said side sills and having a flange extending away from the lading body of the car, a transverse metal plate adapted to be secured to the ends of the side sills outside the lading body, a transverse wood filling and bump-resisting member supported by said transverse plate, metal bumping faces on said filling member, and means for securing the metal plate to said flange.

93. In an end sill traction structure for the traction truck frame of a mine or similar rail car having a lading body, in which the traction truck frame includes side sills extending lengthwise beyond the lading body, the combination of a transverse metal member adapted to be attached to the side sills and having an upright web and an upper horizontal flange, a horizontal metal plate member of greater dimension lengthwise of the car than said flange and attached to said flange, a draw-bar member above said flange, a metal bumper member having an upright bumping face and a horizontal flange directed toward the lading body, and means for securing said draw-bar member and bumper member to said transverse metal member, said draw-bar and bumper members having apertures in vertical alignment for receiving a coupling pin.

94. In a mine or similar rail car for cooperative employment in train with another car having wheels of a predetermined diameter and straight axles and with its bottom located above its axles and a bumper located at the level of said bottom, the combination of wheels of said diameter, a lading bottom located below the horizontal plane of the wheel axes, and bumper means in rigidly connected relationship with said bottom and extending substantially from said bottom to a level with the top of said bumper of the other car.

95. In a mine or similar rail car for cooperative employment in train with another car having wheels of a predetermined diameter and straight axles and with its bottom located above its axles and a bumper located at the level of said bottom, the combination of wheels of said diameter, a lading bottom located below the horizontal plane of the wheel axes, and bumper means in connected relationship with said bottom and extending from below said plane to a level with the top of said bumper of the other car.

96. In a mine or similar rail car, the combination with side sills and a box girder end sill including at least two transverse members spaced lengthwise of the car, of V-shaped bracing means connected to the side sills and extending diagonally from each side sill toward the longitudinal center axis of the car and connected to the outer said transverse member adjacent said axis.

97. In a mine or similar rail car, the combination with side sills and a box girder end sill including at least two transverse members spaced lengthwise of the car, and V-shaped brace means connected to the side sills and passing through the plane of the inner said transverse member and extending diagonally from each side sill toward the longitudinal center axis of the car and connected to the outer said transverse member adjacent said axis.

98. In a mine or similar rail car, the combination with side sills and a box girder end sill including at least two transverse members spaced lengthwise of the car, of V-shaped bracing means connected to the side sills and extending diagonally from each side sill toward the longitudinal center axis of the car and connected to one said transverse member adjacent said axis, and a draft member having an upright portion located inside of and secured to the bracing means adjacent said center axis.

99. In a mine or similar rail car, the combination with side sills and a box girder end sill including at least two transverse members spaced lengthwise of the car, V-shaped brace means connected to the side sills and extending diagonally from each side sill toward the longitudinal center axis of the car, a draft member having an upright portion located inside of the bracing means at said center axis, and securing means passing through said draft member, bracing means and the outer transverse member for holding the same together.

100. In a mine or similar rail car, the combination with side sills and a box girder end sill including at least two transverse members spaced lengthwise of the car, V-shaped bracing means connected to said side sills and extending between said transverse members diagonally from each side sill toward the longitudinal axis of the car and connected to the outer said transverse member adjacent said axis.

101. In a mine or similar rail car, the combination of longitudinal side sills, wing structures including lading-holding walls and braces, said braces comprising narrow members extending transversely of the car beneath the walls, and having their inner ends secured to the inner vertical faces of the sills, said walls terminating at their lower inner edges above the lower inner ends of said braces and being secured to said side sills between said braces.

102. In a mine or similar rail car, the combination of longitudinal side sill-members, wing structures including plate metal lading-holding walls extending laterally outward from the side sill-members and having downwardly extending flanges at their inner edges secured to the inner faces of said side sill-members, and a central bottom structure supported by the side sill-members and located adjacent the lower edges thereof.

103. In a mine or similar rail car, the combination of longitudinal side sills, car wheels and axles, and wing structures including lading-holding walls extending laterally from the side sills and having portions thereof intersecting the longitudinal upright planes of the adjacent wheels at points below the tops of the wheels, each said wing structure including hood members extending over the wheels and each having a pair of longitudinal upright walls located between the inner face of the adjacent side sill and adjacent side of the car.

AUDLEY HART STOW.

DISCLAIMER 1,961,018.—*Audley Hart Stow*, Charleston, W. Va. MINE CAR AND THE LIKE. Patent dated May 29, 1934. Disclaimer filed May 25, 1942, by the assignee, *Sanford Investment Company*.

Hereby enters this disclaimer to claims 7, 8, 10, 11, 14, 15, 16, 17, 18, 19, 20, 21, 22, 23, 24, 25, 26, 27, 28, 29, 30, 31, 34, 35, 36, 37, 38, 39, 40, 41, 42, 43, 44, 45, 47, 48, 49, 50, 51, 52, 53, 54, 55, 56, 58, 60, 61, 62, 65, 66, 67, 68, 69, 70, 74, 78, 80, 81, 85, 86, 89, 90, 91, 94, 95, 97, 100, and 103 of said specification.

[*Official Gazette June 16, 1942.*]